US010475606B2

(12) United States Patent
Schmitz

(10) Patent No.: US 10,475,606 B2
(45) Date of Patent: Nov. 12, 2019

(54) ADJUSTABLE FORCE TACTILE SWITCH

(71) Applicant: Microsoft Technology Licensing, LLC, Redmond, WA (US)

(72) Inventor: Aaron Schmitz, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 86 days.

(21) Appl. No.: 14/864,424

(22) Filed: Sep. 24, 2015

(65) Prior Publication Data

US 2017/0092446 A1 Mar. 30, 2017

(51) Int. Cl.
*H01H 13/20* (2006.01)
*H01H 25/00* (2006.01)
*A63F 13/24* (2014.01)
*H01H 13/85* (2006.01)
*H01H 3/32* (2006.01)

(52) U.S. Cl.
CPC ........... *H01H 25/002* (2013.01); *A63F 13/24* (2014.09); *H01H 13/20* (2013.01); *H01H 13/85* (2013.01); *H01H 2003/323* (2013.01); *H01H 2215/004* (2013.01); *H01H 2215/028* (2013.01); *H01H 2227/034* (2013.01); *H01H 2231/008* (2013.01)

(58) Field of Classification Search
CPC .. H01H 13/702; H01H 13/785; H01H 13/703; H01H 13/85; H01H 2215/004; H01H 2229/028; H01H 13/7006; H01H 25/002; H01H 13/20; H01H 2227/034; H01H 2215/028; H01H 2003/323; H01H 2231/008; A63F 13/24

USPC ......... 200/5 A, 512, 511, 516, 514, 341–345
See application file for complete search history.

(56) References Cited

U.S. PATENT DOCUMENTS

| 3,097,273 | A | 7/1963 | Denner |
| 3,373,386 | A | 3/1968 | Ehrenberg |
| 3,501,607 | A | 3/1970 | Tanaka |
| 3,548,130 | A | 12/1970 | Marquardt |
| 3,676,817 | A | 7/1972 | Bletz |

(Continued)

FOREIGN PATENT DOCUMENTS

CN 101408471 A 4/2009

OTHER PUBLICATIONS

"International Search Report and Written Opinion Issued in PCT Application No. PCT/US2016/045942", dated Nov. 28, 2016, 14 Pages.

(Continued)

*Primary Examiner* — Ahmed M Saeed
(74) *Attorney, Agent, or Firm* — Fiala & Weaver P.L.L.C.

(57) ABSTRACT

Methods, systems, apparatuses, and computer program products are provided for a user input device, such as a game controller, that includes a finger-pressable ("tactile") switch. The switch is adjustable to change the amount of force used to actuate the switch. In an example implementation, a tactile switch comprises a housing, a button interposer, a dome switch, and an adjustment mechanism. A user or other entity may press the button interposer. The dome switch is contained in the housing, and is actuated by the button interposer being pressed. The adjustment mechanism is contained at least partially in the housing, and is configured to enable an amount of force used to press the button interposer to actuate the dome switch to be adjusted.

20 Claims, 14 Drawing Sheets

(56) References Cited

U.S. PATENT DOCUMENTS

| | | | |
|---|---|---|---|
| 3,800,104 A | 3/1974 | Lien et al. | |
| 3,953,697 A | 4/1976 | Teichert | |
| 4,680,825 A | 7/1987 | White et al. | |
| 5,423,227 A | 6/1995 | Polaert et al. | |
| 5,947,267 A | 9/1999 | Kee et al. | |
| 6,023,213 A | 2/2000 | Van Zeeland | |
| 6,051,767 A | 4/2000 | Masubuchi | |
| 6,858,812 B2 | 2/2005 | Sasaki et al. | |
| 7,133,033 B1 | 11/2006 | Sawyer et al. | |
| 7,960,665 B2 | 6/2011 | Sakai et al. | |
| 8,363,013 B2 | 1/2013 | Chang | |
| 2004/0012560 A1* | 1/2004 | Jasso | G06F 1/1662 |
| | | | 345/156 |
| 2011/0069008 A1 | 3/2011 | Kao | |
| 2011/0303043 A1 | 12/2011 | Tang | |
| 2012/0142418 A1* | 6/2012 | Muramatsu | A63F 13/24 |
| | | | 463/37 |
| 2013/0228427 A1 | 9/2013 | Sano | |
| 2015/0136572 A1* | 5/2015 | Liu | H01H 13/52 |
| | | | 200/248 |
| 2017/0043247 A1* | 2/2017 | Hackney | A63F 13/24 |

OTHER PUBLICATIONS

"Razer Spectre", Published on: Dec. 4, 2010, Available at: http://www.teamliquid.net/forum/tech-support/173986-razer-spectre-review, 5 pages.

\* cited by examiner

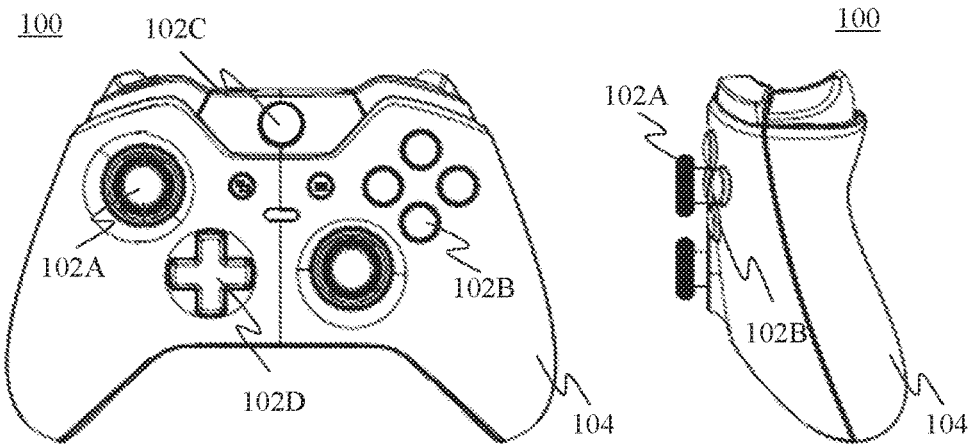
FIG. 1A
FIG. 1B
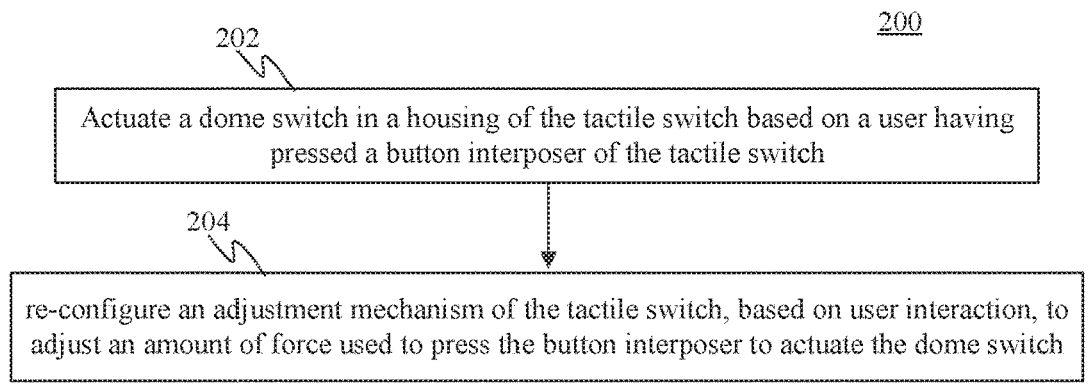
FIG. 2A
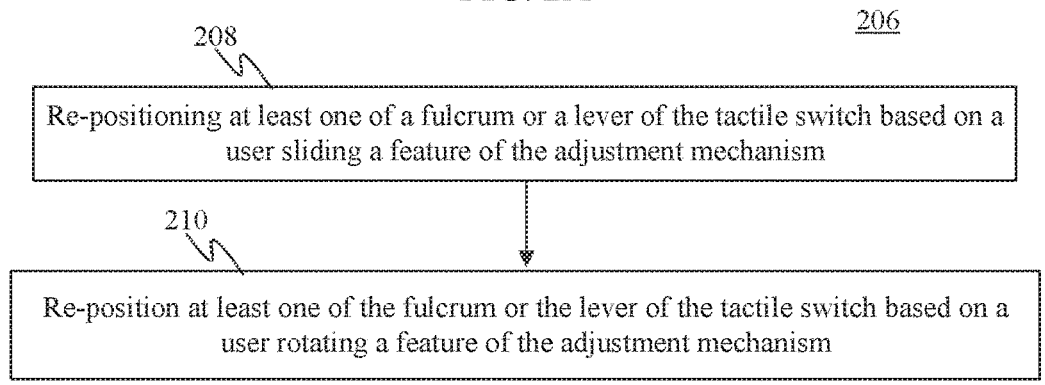
FIG. 2B

ADJUSTABLE FORCE TACTILE SWITCH

BACKGROUND

Various types of handheld control device controllers exist, including handheld remote controls and video game controllers. Remote controls are devices used to control other devices, such as televisions, stereo systems, garage doors, etc. Game controllers are devices used with video game and/or entertainment systems to enable users to provide input, which may include controlling a character in a game, selecting audio and/or video content, and/or controlling other aspects related to the systems. Examples of game controllers include various types of Microsoft® Xbox® controllers developed by Microsoft Corporation of Redmond, Wash., United States, and the PlayStation® DualShock® 3 and 4 controllers, developed by Sony Computer Entertainment, Inc., of Tokyo, Japan. Further examples of handheld control devices include cell phones, laptop computers, tablet computers, computer mice, keyboards, smart watches, augmented and virtual reality headsets and their controllers, etc.

A handheld control device may include various input mechanisms, including one or more thumbsticks, one or more finger-pressable buttons, etc. Such input mechanisms may be actuatable by a user to provide input for a variety of functions. For example, a user may press a button on a game controller to fire an in-game weapon, or may press a button on a remote control to change channels. A particular amount of force must be applied to cause a particular button to be actuated.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer program products are provided for a user input device, such as a game controller, that includes a finger-pressable ("tactile") switch. The switch is adjustable to change the amount of force used to actuate the switch. In an example implementation, a tactile switch comprises a housing, a button interposer, a dome switch, and an adjustment mechanism. A user or other entity may press the button interposer. The dome switch is contained in the housing, and is actuated by the button interposer being pressed. The adjustment mechanism is contained at least partially in the housing, and is configured to enable an amount of force used to press the button interposer to actuate the dome switch to be adjusted.

Further features and advantages of various embodiments of the disclosure, as well as the structure and operation of various embodiments of the disclosure, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIGS. 1A and 1B show front and side views, respectively, of an example user input device.

FIG. 2A shows a flowchart providing a process for operating a tactile switch, according to an example embodiment.

FIG. 2B shows a flowchart providing example processes for re-configuring switch features to adjust the force used to actuate a tactile switch, according to an example embodiment.

Figure 3:
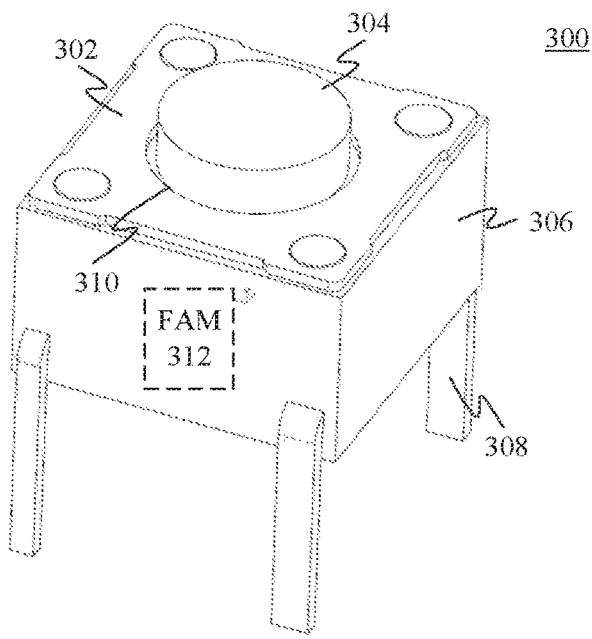
FIG. 3 shows a perspective view of a tactile switch configured with a force adjustment mechanism, according to an example embodiment.

The subject matter of the present application will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Furthermore, it should be understood that spatial descriptions ("above," "below," "up," "left," "right," "down," "top," "bottom," "vertical," "horizontal," etc.) used herein are for purposes of illustration only, and that practical implementations of the structures described herein can be spatially arranged in any orientation or manner.

Still further, when opposing first and second surfaces are mentioned, it should be understood that the first surface and/or the second surface may be a tiered or multi-part surface, such that the surface includes multiple sub-surfaces that are each generally opposed to the opposing surface, and may connect with each other with via other surfaces/features.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments for an Adjustable Force Tactile Switch

User input devices exist that include various buttons and other user interface features, such as a thumbstick and/or other input mechanisms. Such user input devices enable users to interact with other devices. For instance, a television remote control enables a user to interact with a television. Another form of remote control device may be used to control an unmanned aircraft (e.g., a drone) or land-based vehicle. A game controller is a type of user input device that is designed to facilitate user interaction with a video game or other application executing on a computer, video game console, or other platform. For example, a game controller may provide a means by which a user can control a character or object within a video game. A variety of different types of game controllers exist and each game controller type may include one or more user-actuatable control elements via which a user can provide input. For example, a conventional game controller that is designed to be held in two hands (sometimes referred to as a "gamepad", "control pad", or "joypad") may include one or more user-actuatable buttons, triggers, thumbsticks, directional pads, touch pads, and the like. Each of these control elements may be manipulated by a user to generate various control signals for interacting with a video game. Further examples of user input devices include cell phones, desktop computers, laptop computers, tablet computers, computer mice, keyboards, smart watches, augmented and virtual reality headsets and their controllers, etc.

As noted above, some user input devices, such as game controllers, include at least one switch. A switch is a component that can be pressed by a user along an axis to control or otherwise interact with a video game or other application. For instance, the user may press the switch with a finger to actuate the switch. An example of such as finger-pressable switch is a tactile switch (sometimes referred to as a "tact switch"). One or more tactile switches may be incorporated in a user input device, such as in one or more push buttons, in thumbsticks (where the thumbstick may be pressed to provide input), etc.

Different users have different preferences in what they consider to be the "best" or preferred amount of force required to actuate (activate) a switch, and it may be desired (e.g., in the gaming industry) for the actuate force for a switch to be adjustable. Accordingly, embodiments disclosed herein provide a switch system/assembly that enables the end user to adjust the actuation force to their preference. Furthermore, embodiments enable the force to be adjusted while maintaining the desired tactile ratio (sometimes called "snap ratio") or "clickiness" of a switch.

The tactile ratio defines how "snappy" a switch is (how much the switch clicks). The tactile ratio is defined as:

$$\text{Tactile ratio} = (FTA - FTC)/FTA$$

where:

FTA=force to actuate (the peak force used to press a switch); and

FTC=force to close the switch (the minimum force required to keep the switch closed after it has been actuated).

For a typical tactile switch, it is desired that the force to actuate (FTA) is slightly greater than the force to close (FTC). For instance, the FTA may be 450 gram-force (gF), and the FTC may be 300 gF, for a tactile ratio of 33%. Embodiments enable the tactile ratio for a particular tactile switch to be maintained, while enabling the FTA to be adjusted (i.e., the FTA and the FTC may be adjusted proportionally).

In embodiments, the actuation force for a tactile switch may be adjusted without disassembly of the tactile switch. A force adjustment mechanism is incorporated in the tactile switch assembly. The force adjustment mechanism includes a user interface feature, such as a slideable tab, pin, or stick, a rotatable button, etc., which may be interacted with by a user to adjust the FTA for the tactile switch. In other embodiments, the force adjustment mechanism may be manipulated by an alternative external entity, such as a motor or other electromechanical actuator controlled by software on the input device or other suitable means.

Embodiments are applicable to all types of user input devices that include one or more pressable switches. For instance, FIGS. 1A and 1B show front and side views, respectively, of an example game controller 100 that includes several switches, including those contained in first-fourth button mechanisms 102A-102D accessible on a housing 104 of game controller 100. The switches within button mechanisms 102A-102D may each be configured for actuation force adjustability according to embodiments disclosed herein. Game controller 100 is an example user input device, and is provided for purposes of illustration, and is not intended to be limiting. User input devices to which embodiments apply (e.g., game controllers, remote control devices) may have different shapes, different sizes, different numbers and/or placements of user interface features (buttons, knobs, switches, triggers, pads, sticks, thumbsticks, etc.), and/or other similarities or differences from game controller 100 shown in FIGS. 1A and 1B. Examples of switch-related functionality of game controller 100 is described as follows.

Button mechanisms 102A-102D each comprise switches that may be actuated when pressed by a user of game controller 100. For instance, button mechanism 102A is a thumbstick (on the left side of the face of housing 104 visible in FIG. 1A) that can be tilted by a finger of a user, typically the thumb, but sometimes with another finger of the user. Furthermore, a pressable switch is built into the thumbstick that may be pressed. Button mechanism 102B is included in a set of pressable buttons (four buttons arranged in a diamond shape on the right side of the face of housing 104), and includes a switch that may be pressed by a user. Button mechanism 102C is a set of buttons (located at an upper central location of the face of housing 104) that may be pressed by a user. Button mechanism 104D is a cross-shaped directional pad, or "D-pad," (on the lower left face of housing 104) that is a four-way, finger operated directional control with a button in each arm of the cross shape. As such, button mechanism 104D may be considered to include four separate switches that each may be pressed by the user.

Each of switches 102A-102D may be pressed to cause an action out of a game (e.g., browsing of television channels) or within a game being played by the user, such as the turning on or off of the controller and/or gaming system, aiming of a weapon, firing of a weapon, changing of a game setting, causing a particular motion of a character (e.g., running), and/or causing/enabling other out-of-game or in-game action.

The facings of switches 102A-102D (e.g., buttons, thumbstick D-Pad, etc.) accessible on housing 104 may be made of plastic, metal, and/or other materials. Housing 104 can be a single piece case or housing, or a case or housing formed of two more interlocking pieces (e.g., top and bottom portions). Housing 104 may be made from any suitable material(s), including plastic (e.g., injection molded), metal or combination of metals/alloys, etc. Housing 104 may include mechanical and electrical components (e.g., joystick assembly containing sensors) that receive an indication of the pressing of switches 102A-102D, and transmit the indication (e.g., to one or more processors contained in game controller 100 and/or in a remote component).

Embodiments can operate in various ways to enable adjustment of actuation force for switches. For example, FIG. 2A shows a flowchart 200 providing a process for operating a tactile switch with adjustable actuation force, according to an example embodiment. The user input devices described herein, such as game controller 100, may be configured to operate according to flowchart 200, in embodiments. Further structural and operational embodiments will be apparent to persons skilled in the relevant art(s) based on the following description of flowchart 200.

Flowchart 200 begins with step 202. In step 202, a dome switch in a housing of the tactile switch is actuated based on a user having pressed a button interposer of the tactile switch. A button of a game controller (or other type of button or switch), such as each of switches 102A-102D, typically contains an internal switch mechanism. The user presses an externally accessible button (e.g., one of switches 102A-102D), which causes a dome switch of the switch mechanism to be actuated. The actuation of the dome switch is registered mechanically and/or electrically (e.g., as an electrical signal) indicating the button has been pressed. In particular, the switch mechanism is compressed when the switch is pressed by a user's finger, providing a corresponding resistance that is felt by the user's finger. The user has to overcome the resistance with sufficient finger strength to cause the dome switch to be actuated, resulting in the registering of the button press.

In embodiments, a game controller may include a force adjustment mechanism. The force adjustment mechanism is configured to change the amount of force used to actuate the switch. The force adjustment mechanism may have an initial, default setting so that the switch mechanism of a button, such as any of switches 102A-102D in FIGS. 1A and 1B, has a particular (e.g., predetermined) amount of actuation force. For example, the force adjustment mechanism may set a lever/fulcrum combination of the switch mechanism to a particular setting that results in the actuation force. A user that pushes the button with a finger feels the force as a particular amount of resistance to the pushing, which is dictated by the configuration of the lever/fulcrum. The less leverage provided by the lever and fulcrum, the greater the resistance to pushing the button. The greater the leverage, the lesser the resistance to pushing the button.

In step 204, an adjustment mechanism of the tactile switch is re-configured, based on user interaction, to adjust an amount of force used to press the button interposer to actuate the dome switch. In an embodiment, the force adjustment mechanism enables the user to change the actuation force by changing the configuration of the lever/fulcrum contained in the switch. For example, the user may be enabled to increase the actuation force to a particular amount by repositioning the lever and/or fulcrum to create a shorter length lever, or to decrease the actuation force to a particular amount by repositioning the lever and/or fulcrum to create a longer length lever. The user pushing the button (e.g., along a button axis) with a finger feels the change in actuation force as an amount of resistance to the pushing, corresponding to the changed lever length. If the lever length is increased, the actuation force and resistance to button pressing is decreased. If the lever length is decreased, the actuation force and resistance to button pressing is increased.

Figure 4:
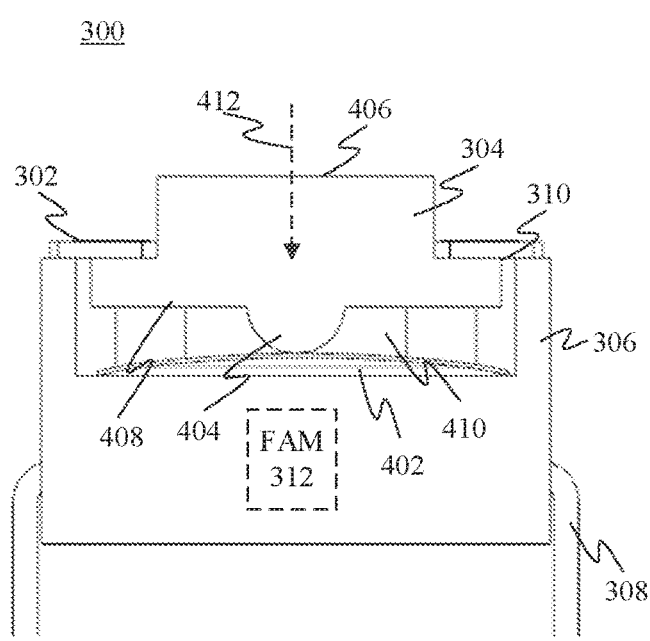
FIG. 4 shows a cross-sectional view of the tactile switch of FIG. 3, according to an example embodiment.
Figure 5:
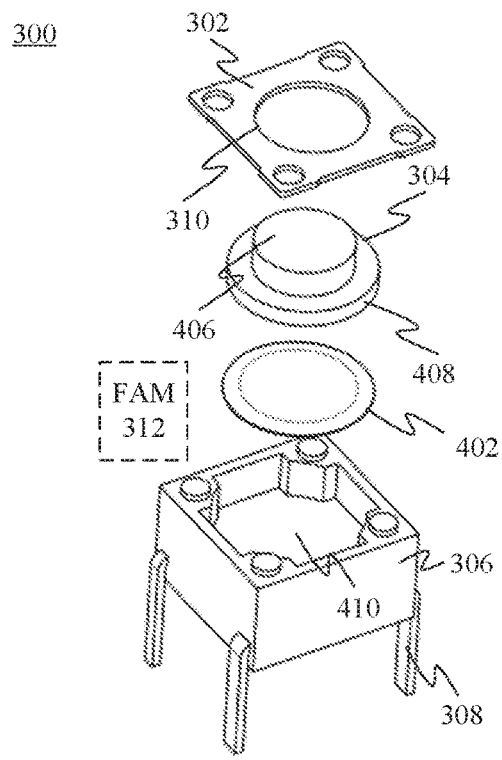
FIG. 5 shows an exploded view of the tactile switch of FIG. 3, according to an example embodiment.

Tactile switches (switches that are pressable) may be configured in various ways to have adjustable actuation force. By way of example, FIGS. 3-5 show views of a tactile switch 300 configured with a force adjustment mechanism (FAM) 312, according to an example embodiment. FIG. 3 shows a perspective view, FIG. 4 shows a cross-sectional view, and FIG. 5 shows an exploded view of tactile switch 300. Tactile switch 300 of FIGS. 3-5 is described as follows.

As shown in FIGS. 3-5, tactile switch 300 includes a surface panel 302, a button interposer 304, a housing 306 (surface panel 302 may be considered as part of housing 306 in some embodiments), a dome switch 402 (not visible in FIG. 3), and FAM 312. As shown in FIG. 4, button interposer 304 is generally "hat" shaped, having opposing outer and inner surfaces 406 and 408. Outer surface 408 extends through an opening 310 in surface panel 302 so that it is outside/external, and forms the "top" of the "hat" shape (the smaller area surface). Inner surface 408 is contained inside housing 306, forming the "bottom" of the "hat" shape (e.g., the surface below the "brim," having a greater surface area). Outer surface 406 is designed to be manipulated by a user's finger, and in this example is flat in shape, though outer surface 406 may have other shapes (e.g., concave, convex). Button interposer 304 may have other shapes than shown in FIGS. 3-5, and may be made out of any suitable material (e.g., plastic, metal, etc.) according to any suitable manufacturing process (e.g., injection molding, etc.).

As shown in FIG. 4, the "brim" of button interposer 304 serves to retain button interposer 304 in housing 306 of tactile switch 300 such that it cannot be removed through opening 310 of surface panel 302. In some embodiments, button interposer 304 may be retained by the input device in which the tactile switch is housed instead of or in addition to the tactile switch itself. For example, in the case of game controller 100, button interposer 304 may include the visible facing of button mechanism 102B and button interposer 304 may be retained by housing 104 or other suitable features within game controller 100. Note that in any of the embodiments described herein comprising a button interposer, input device features external to the tactile switch may provide alignment of the button interposer to the tactile switch, prevent the button interposer from tilting relative to tactile switch, or otherwise constrain the button interposer as necessary for it to perform its function within the tactile switch. In such implementations, the button interposer may not be constrained or retained by the tactile switch.

In another embodiment, button interposer 304 may be a single-piece button interposer, or may be a combination of multiple, separate pieces. For instance, in one example, a first portion of button interposer 304 (e.g., the "top" in FIG. 4) may be external to housing 306, and a second portion of button interposer 304 (e.g., the "brim" in FIG. 4) may be internal to housing 306. A user that pressing the external portion causes the internal portion to be pushed as well, thereby pressing the entirety of button interposer 304.

Dome switch 402 is contained in housing 306 in a cavity 410. Dome switch 402 is circular in shape when viewed from top or bottom, and has a curved cross-section, being concave at bottom in FIG. 4. Dome switch 402 may be made out of any suitable material, including metal, rubber, etc. through any suitable manufacturing method including stamping, compression molding, etc. Dome switch 402 may take any suitable shape (e.g., square, rectangular, cross-shaped) provided it can flex downward when pressed with suitable force at or near its center and return to its original shape when released. Dome switch 402 is configured to be actuated by pressing button interposer 304. For instance, as shown in FIG. 4, inner surface 408 of button interposer 304 may optionally include a protrusion 404. Protrusion 404 may have any cross-sectional shape, including rounded (a bump or nub, as in FIG. 4), pointed (e.g., triangular), or other shape, may or may not be elongated, and may be positioned at a center or other location on inner surface 408. Protrusion 404 extends towards dome switch 402 (downward in FIG. 4) to contact a surface of dome switch 402. Accordingly, when outer surface 406 of button interposer 304 is pressed by a user (in the direction of arrow 412, along an axis of button interposer 304), protrusion 404 is forced into dome switch 402, causing dome switch 402 to flex downward in its center and be actuated, thereby actuating tactile switch 300. In some embodiments, dome switch 402 may be comprised of two or more individual dome-shaped components stacked on top of each other in order to increase the force required to flex dome switch 402.

In some embodiments, one or more conductive contacts may be placed under dome switch 402 where dome switch 402 contacts housing 306 when no force is applied to button interposer 304 (e.g., under the edge of dome switch 402) and one or more conductive contacts may be placed under dome switch 402 where dome switch 402 does not contact housing 306 when no force is applied to button interposer 304 (e.g., under the center of dome switch 402) such that when a user presses with sufficient force on outer surface 406 of button interposer 304 dome switch 402 flexes downward and contacts one or more of the conductive contacts it was not previously in contact with closing the circuit. In other embodiments, dome switch 402 may be in contact with zero contacts when no force is applied to button interposer 304 but electrically connect two or more contacts that dome switch 402 comes into contact with when a user presses with sufficient force on outer surface 406 of button interposer 304. In both the preceding sets of embodiments, if dome switch 402 is formed from a non-conductive material (e.g., rubber) a conductive material may be added to the underside of dome switch 402 to allow it to electrically connect two or more contacts. For example, a disk-shaped carbon puck may be added to the center of the underside of dome switch 402. In yet other embodiments, dome switch 402 may not be used to create an electrical connection. Instead, the actuation of the tactile switch 300 may be measured through any suitable means including sensors either internal or external to tactile switch 300 (e.g., optical sensors, Hall effect sensors, force sensors).

In one implementation, housing 306 is a body formed from a plastic material using injection molding, surface panel 302 is formed from stamped sheet metal, and surface panel 302 is heat staked to housing 306 (e.g., see four corner studs holding surface panel 302 to housing 306 in FIG. 3). Alternatively, housing 306 and/or surface panel 302 may be formed from other materials, including one or more of a metal, a plastic, an epoxy, etc. In another embodiment, surface panel 302 may be attached to housing 306 by snap features. In another embodiment, housing 306 and surface panel 302 may be formed as a single piece unit. In alternative embodiments, tactile switch 300 may be formed directly into a remote control housing or other surface, and as such as discrete housing 306 may not be present. As shown in FIG. 3, one or more legs 308 may extend from housing 306 that are used to mount tactile switch 300 to a board (e.g., a circuit board) or other structure. In the example of FIG. 3, legs 308 extend downward from the bottom of tactile switch 300. In other implementations legs 308 may extend from the front, back, left, right, or top of housing 306 such that tactile switch 300 can be mounted in a desired orientation. Alternatively or in addition, legs 308 may be bent such that tactile switch 300 can be mounted in a desired orientation. In particular, legs 308 may each bend in substantially the same direction. Legs 308 may connect to conductive contacts under dome switch 402 and may conduct an electrical signal from tactile switch 300 indicating the actuation of tactile switch 300. In other embodiments, legs 308 may be electrically conductive pads, pins, solder balls, or other type of interconnection member. Legs 308 may be formed from any suitable material (e.g., metal) through any suitable manufacturing process (e.g., stamping) and attached to housing 306 in any suitable manner. In some embodiments housing 306 may be insert molded over legs 308. In addition to legs 308, housing 306 may include any suitable number of other attachment features including pins, holes, etc.

FAM 312 is contained at least partially in housing 306. FAM 312 is configured to enable an amount of force used to press button interposer 304 to actuate dome switch 402 to be adjusted. For instance, FAM 312 may include a lever, a fulcrum, one or more user interface elements, and/or other structures that enable the actuation force to be adjusted. Examples of user interface elements that may enable adjustment of the actuation force include a slideable pin, a rotatable button, etc.

Such user interface elements may be configured in various ways to enable actuation force adjustment. For instance, FIG. 2B shows a flowchart 206 providing example processes for re-configuring switch features to adjust the force used to actuate a tactile switch, according to an example embodiment. Flowchart 206 may be performed during step 204 of FIG. 2A, in embodiments. Either of steps 208 and 210 of flowchart 206 may be performed in embodiments to enable actuation force to be adjustable. Steps 208 and 210 are described as follows.

In step 208, a feature of the adjustment mechanism is configured to be slideable to cause an adjustment of the amount of force. In an embodiment, a user may interact with a pin, knob, or post extending from tactile switch 300. The pin, knob, or post may be slid along a surface of tactile switch 300, or directly into and/or out of tactile switch 300. The position in which the pin is slid causes tactile switch 300 to have a corresponding amount of tilt tension.

In step 210, the button interposer is configured to be rotatable to cause the adjustment of the amount of force. In an embodiment, a user may rotate button interposer 304 (or other button) extending from tactile switch 300. The user may rotate the button by hand or by using a tool, depending on the particular configuration. The position in which the button is rotated causes tactile switch 300 to have a corresponding amount of tilt tension.

Tactile switches can be configured in various ways to perform the processes of FIGS. 2A and 2B and may be configured with adjustable actuation force in various ways. Example embodiments are described in the following subsections. These example embodiments are provided for purposes and are not intended to be limiting. Furthermore, the embodiments described herein may be combined in any manner.

A. Example Sliding Lever Embodiments for Enabling Actuation Force Adjustment

Figure 6:
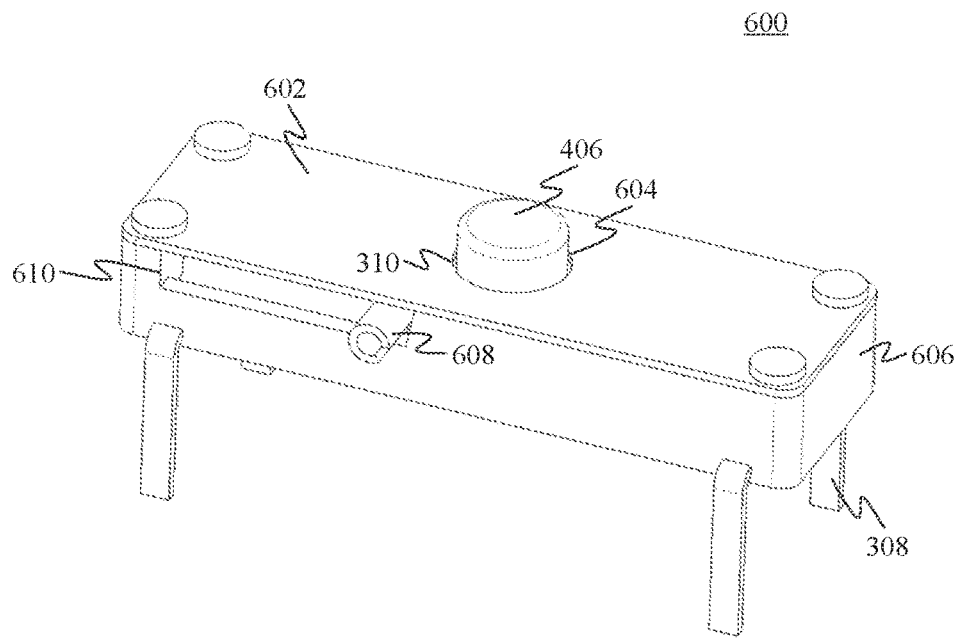
FIG. 6 shows a perspective view of a tactile switch configured with a slideable lever for adjustment of switch actuation force, according to an example embodiment.
Figure 7:
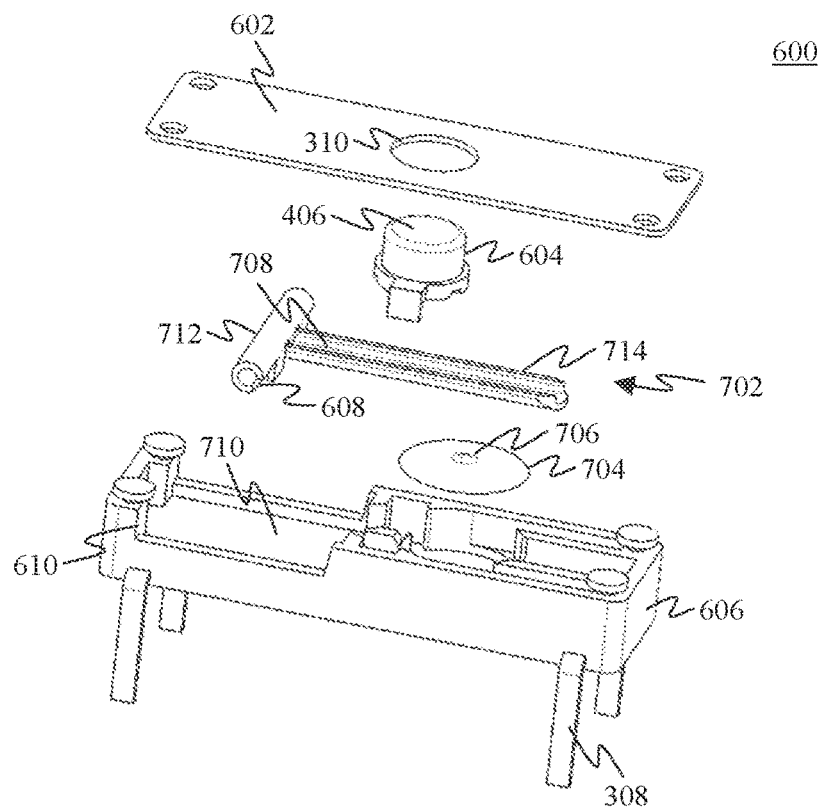
FIG. 7 shows an exploded view of the tactile switch of FIG. 6, according to an example embodiment.
Figure 8:
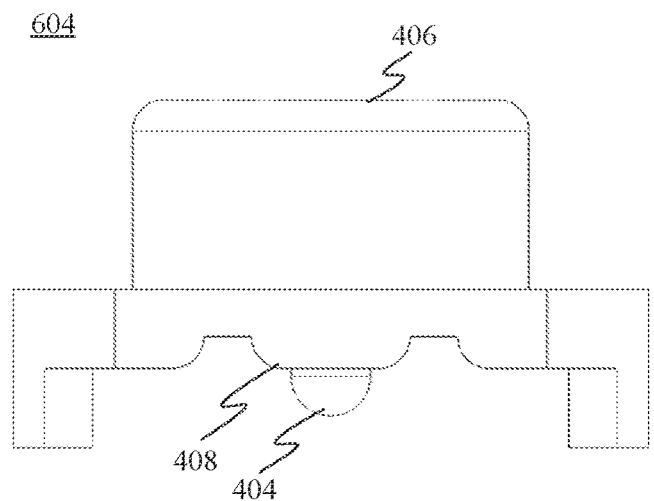
FIG. 8 shows a side view of a button interposer of the tactile switch of FIG. 6, according to an example embodiment.
Figure 9:
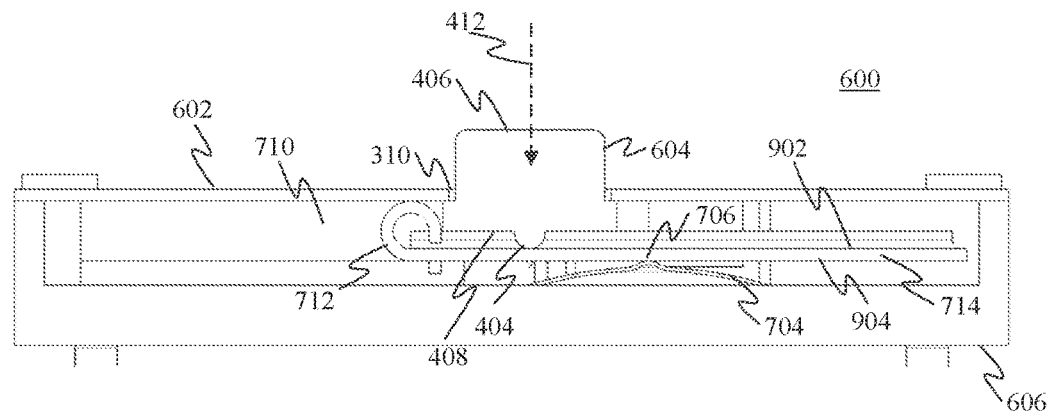
FIGS. 9 and 10 show cross-sectional views of the tactile switch of FIG. 6 with the slideable lever in high and low actuation force positions, respectively, according to example embodiments.
Figure 10:
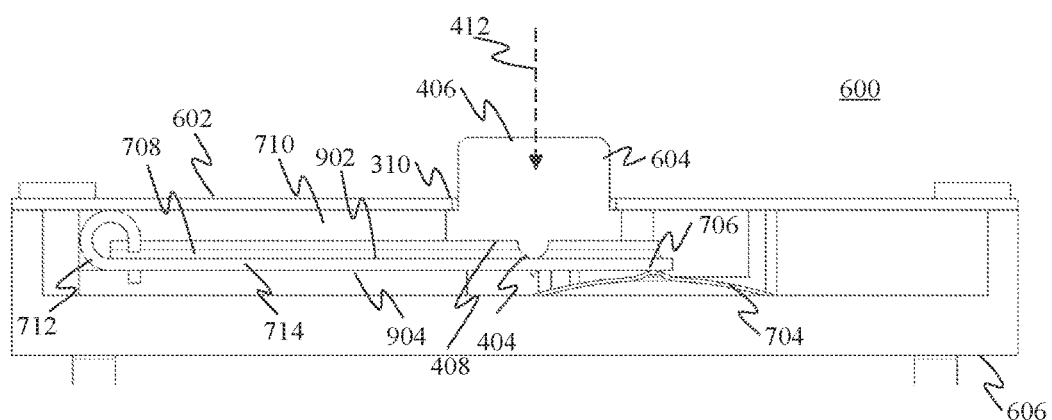

In embodiments, FAM 312 (FIGS. 3-5) may include a slideable lever used to set the actuation force of tactile switch 300 to a range of actuation forces. For instance, FIGS. 6-10 show views related to a tactile switch 600 configured with a slideable lever for adjustment of switch actuation force, according to an example embodiment. FIG. 6 shows a perspective view, and FIG. 7 shows an exploded view of tactile switch 600. FIG. 8 shows a cross-sectional view of a button interposer 604 of tactile switch 600. FIGS. 9 and 10 show cross-sectional views of tactile switch 600 in high and low force lever positions, respectively. In embodiments, tactile switch 600 may be configured according to flowchart 200 of FIG. 2A, and step 208 of FIG. 2B. FIGS. 6-10 are described as follows.

As shown in FIGS. 6 and 7, tactile switch 600 includes a surface panel 602, a button interposer 604, a housing 606 (surface panel 602 may be considered as part of housing 606 in some embodiments), a slideable lever body 702, and a dome switch 704 (not visible in FIG. 6). As shown in FIG. 8, button interposer 604 is generally "hat" shaped, having opposing outer and inner surfaces 406 and 408. Outer surface 408 extends through an opening 310 in surface panel 602 to be outside/external, and forms the "top" of the "hat" shape. Inner surface 408 is contained inside housing 606 (in internal cavity 710), forming the "bottom" or "brim" of the "hat" shape. As shown in FIG. 8, inner surface 408 of button interposer 604 may include protrusion 404, having any suitable cross-sectional shape (e.g., rounded in FIG. 8).

Button interposer 604 may have other shapes than shown in FIGS. 6-8, and may be made out of any suitable material (e.g., plastic, metal, etc.) according to any suitable manufacturing process (e.g., injection molding, etc.). For example, as shown in FIGS. 7 and 8, button interposer 604 may have flanges that extend from opposing first and second sides of a lower portion of button interposer (at inner surface 408). A shown in FIG. 8, the flanges bend downward. The flanges are used to interface button interposer 604 with housing 606 (e.g., FIG. 7 shows slots/guides in cavity 710 of housing 606 into which the flanges insert). Housing 606 may be formed similarly to housing 306 (FIG. 3) described above, and may have one or more legs 308 described above.

Similar to dome switch 402 of FIGS. 4 and 5, dome switch 704 is contained in housing 606 in a cavity 710. Dome switch 704 is circular in shape when viewed from top or bottom, and has a curved cross-section, having a bottom concave surface in FIG. 7. Dome switch 704 has a bump 706 formed in the center of its top convex surface. Bump 706 is optional. Dome switch 704 resides on a lower inner surface of housing 606 in a cylindrical portion of cavity 710. Dome switch 704 may be made out of any suitable material, including metal, rubber, etc. through any suitable manufacturing method, including stamping, compression molding, etc. and may take on any suitable shape that allows it to flex when pushed with suitable force similar to dome switch 402 described above. Additionally, dome switch 704 may serve to conduct electricity between two contacts when pushed with suitable force similar to dome switch 402 described above.

Lever body 702 includes a pivot end 712, a lever arm 714, and handle 608. Lever arm 714 extends from pivot end 712 and has opposing first and second surfaces 902 and 904 (FIG. 9). Pivot end 712 is an end of lever body 702 that can rotate, but is held from being moved vertically in tactile switch 600. In the example of FIG. 7, pivot end 712 is shown as being cylindrical in shape, having opposing first and second round ends. Pivot end 712 may optionally include one or more tabs (shown as being rectangular in FIG. 7, extending from a bottom edge) for position and orientation control of lever body 702. Lever arm 714 is shown as being elongated, and may optionally include a lengthwise trench 708 between lengthwise stiffener rails. In other embodiments, pivot end 712 and lever arm 714 may have other shapes, including both being flat, rounded, etc. Lever body 702 may be made out of any suitable material, including plastic, metal, etc. through any suitable manufacturing method, including injection molding, stamping, etc. In the example of FIGS. 6-10, button interposer 604 contacts lever arm 714 between pivot end 712 and the region where lever arm 714 contacts dome switch 704. In other embodiments, the position of button interposer 604 and dome switch 704 may be swapped such that dome switch 704 contacts lever arm 714 between pivot end 712 and the region where button interposer 604 contacts lever arm 714.

Note that the description herein, with regard to any/all embodiments, may state that a lever arm/body "contacts" the dome switch. Alternatively, in other embodiments, one or more rigid or flexible intermediate components, which serve at least in part to transfer force between the lever arm/body and the dome switch, may be present between the lever arm/body and dome switch. Therefore, in embodiments, the lever arm/body may be considered to be "coupled to" the dome switch, meaning that the lever arm/body may be in direct contact or may be connected together via one or more intermediate components.

Handle 608 is an end of pivot end 712 that extends through a second opening 610 (FIG. 6) in a side surface of housing 606 (e.g., when surface panel 302 is applied to the top of housing 306 to form the enclosure of tactile switch 300). Second opening 610 is rectangular, running along the side surface of housing 606. Handle 608 is externally accessible and moveable (by a user) to slide lever body 702 along second opening 610 to adjust the amount of the actuation force for tactile switch 600. In an embodiment, opposing sides of housing 606 may each include an instance of second opening 610. As such, the first and second ends of pivot end 712 may each extend from a corresponding second opening 610 to be accessible as corresponding handles 608. Note that in an alternative embodiment, instead of handle 608 extending from an opening (e.g., second opening 610) that is separate from first opening 310, handle 608 may extend from first opening 310.

When lever body 702 is positioned in housing 606, first surface 902 of lever arm 714 receives protrusion 404 of inner surface 408 of button interposer 604. Second surface 904 of lever arm 714 contacts dome switch 704 at bump 706. Pivot end 712 can rotate to enable lever arm 714 to be rotated downward in housing 606 into dome switch 704 when button interposer 604 is pressed, thereby causing dome switch 704 to be actuated. The position of lever body 702 in housing 606, as set by a user interacting with handle 608, dictates the amount of force the user pressing button interposer 604 has to apply to actuate dome switch 704.

For example, FIG. 9 shows tactile switch 600 in a high actuation force position. In FIG. 9, handle 608 has been slid as far right as possible, shortening as much as possible the distance between pivot end 712 and the contact point between lever arm 714 and dome switch 704 (at bump 706), and maximizing the length of lever arm 714 that extends past that contact point. In this configuration, the maximum force is required to press button interposer 604, causing lever body 702 to pivot at pivot end 712, rotating lever arm 714 into dome switch 704, and thereby actuating dome switch 704.

In contrast, FIG. 10 shows tactile switch 600 in a low actuation force position. In FIG. 10, handle 608 has been slid as far left as possible, lengthening as much as possible the distance between pivot end 712 and the contact point between lever arm 714 and dome switch 704 (at bump 706), and minimizing the length of lever arm 714 that extends past that contact point. In this configuration, the minimum force is required to press button interposer 604, causing lever body 702 to pivot at pivot end 712, rotating lever arm 714 into dome switch 704, and thereby actuating dome switch 704.

FIGS. 9 and 10 show extreme positions for handle 608 (and lever body 702) for purposes of illustration. Using handle 608, a user may position lever body 702 at the positions of FIG. 9 or 10, or any position in between, to set a corresponding actuation force for tactile switch 600. The further right (in FIGS. 9 and 10) that handle 608 is slid, the shorter the distance between pivot end 712 and the contact point between lever arm 714 and dome switch 704, and therefore the higher the required actuation force. The further left that handle 608 is slid, the longer the distance between pivot end 712 and the contact point between lever arm 714 and dome switch 704, and therefore the lower the required actuation force. If the position of button interposer 604 and dome switch 704 is swapped relative to pivot end 712 as described above, the reverse is true (i.e. moving lever body 702 to the left increases activation force and moving lever body 702 to the right decreases activation force).

B. Example Sliding Fulcrum Embodiments for Enabling Actuation Force Adjustment

Figure 11:
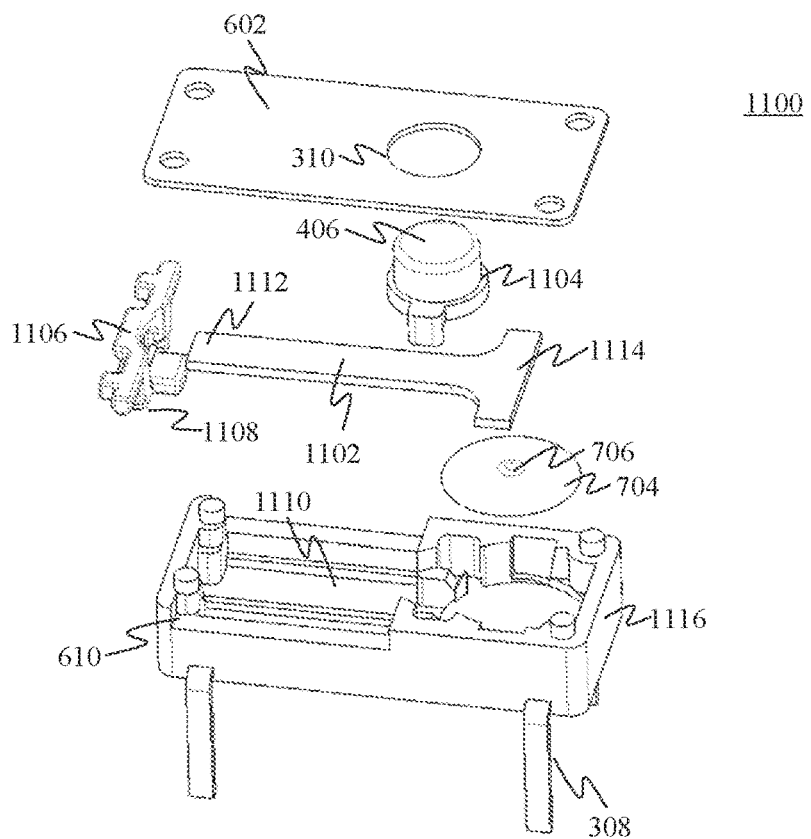
FIG. 11 shows an exploded view of a tactile switch configured with a slideable fulcrum for adjustment of switch actuation force, according to an example embodiment.
Figure 12:
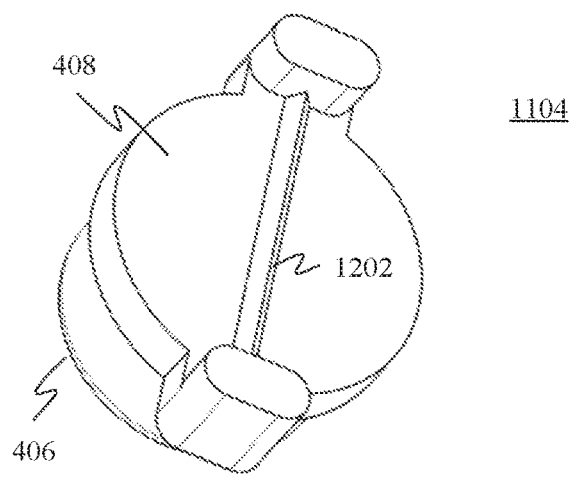
FIG. 12 shows a perspective view of a button interposer of the tactile switch of FIG. 11, according to an example embodiment.
Figure 13:
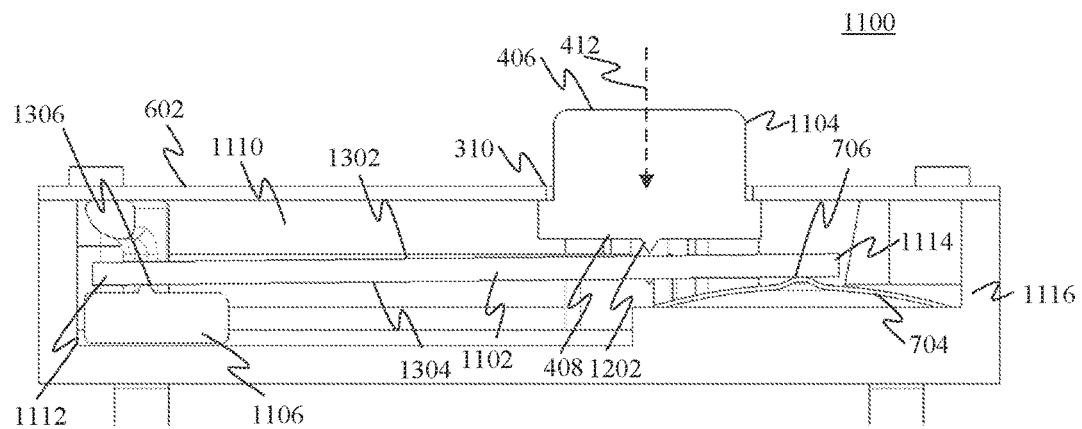
FIGS. 13 and 14 show cross-sectional views of the tactile switch of FIG. 11 with fulcrum in low and high actuation force positions, respectively, according to example embodiments.
Figure 14:
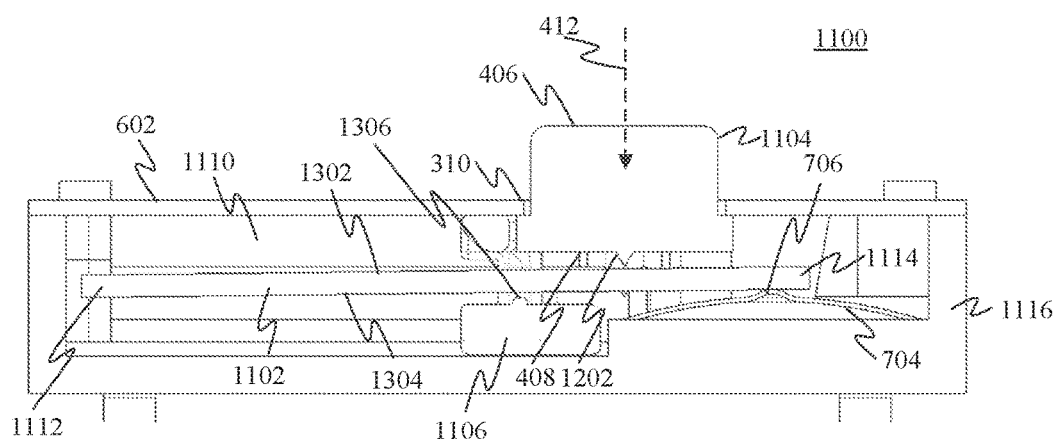

In embodiments, FAM 312 (FIGS. 3-5) may include a slideable fulcrum used to set the actuation force of tactile switch 300 to a range of actuation forces. For instance, FIGS. 11-14 show views related to a tactile switch 1100 configured with a slideable fulcrum for adjustment of switch actuation force, according to an example embodiment. FIG. 11 shows an exploded view of tactile switch 1100. FIG. 12 shows a perspective view of a button interposer 1104 of tactile switch 1100. FIGS. 13 and 14 show cross-sectional views of tactile switch 1100 in low and high force fulcrum positions, respectively. In embodiments, tactile switch 1100 may be configured according to flowchart 200 of FIG. 2A, and step 208 of FIG. 2B. FIGS. 11-14 are described as follows.

As shown in FIG. 11, tactile switch 1100 includes surface panel 602, a housing 1116 (surface panel 602 may be considered part of housing 1116 in some embodiments), a lever arm 1102, a button interposer 1104, a slideable fulcrum 1106, and dome switch 704. Outwardly, tactile switch 1100 may appear generally similar to tactile switch 600 shown in FIG. 6, except that relative to tactile switch 600, opening 310 in surface panel 602 is shifted closer to an end of tactile switch 1100. This is illustrated in FIG. 11, which shows opening 310 in surface panel 602 shifted away from center (to the right). As shown in FIGS. 11 and 12, button interposer 1104 is generally "hat" shaped, having opposing outer and inner surfaces 406 and 408. Outer surface 408 extends through an opening 310 in surface panel 602 to be outside/external, and forms the "top" of the "hat" shape. Inner surface 408 is contained inside housing 1116 (in cavity 1110), forming the "bottom" or "brim" of the "hat" shape. As shown in FIG. 11, inner surface 408 of button interposer 1104 may include protrusion 1202, having any suitable cross-sectional shape (e.g., triangular in FIG. 12).

Button interposer 1104 may have other shapes than shown in FIGS. 11-14, and may be made out of any suitable material (e.g., plastic, metal, etc.) according to any suitable manufacturing process (e.g., injection molding, etc.). For example, as shown in FIGS. 11 and 12, button interposer 1104 may have flanges that extend from opposing first and second sides of a lower portion of button interposer (at inner surface 408). As shown in FIG. 11, the flanges bend downward. The flanges are used to interface button interposer 1104 with housing 1116 (e.g., FIG. 7 shows slots/guides in cavity 710 of housing 1116 into which the flanges insert). Housing 1116 may be formed similarly to housing 306 (FIG. 3) described above, and may have one or more legs 308 described above.

Lever arm 1102 has first and second end portions 1112 and 1114, and opposing first and second surfaces 1302 and 1304 (FIGS. 13 and 14). Lever arm 1102 may be made out of any suitable material, including plastic, metal, etc. through any suitable manufacturing method, including injection molding, stamping, etc. First surface 1302 of lever arm 1102 receives optional protrusion 1202 of inner surface 408 of button interposer 1104. In some embodiments, button interposer 1104 may be rigidly attached to lever arm 1102. In some such embodiments, they may be formed as a single part. Second surface 1304 of lever arm 1102 contacts optional protrusion 1306 (FIG. 13) of fulcrum 1106 at first end portion 1112, and contacts dome switch 704 (at bump 706) at second end portion 1114. In particular, in tactile switch 1100 first end portion 1112 of lever arm 1102 inserts in a slot in fulcrum 1106. In other embodiments fulcrum 1106 may not have a slot and lever arm 1102 may contact the top of fulcrum 1106. Fulcrum 1106 is held from being moved vertically in tactile switch 1100, and holds first end portion 1112 of lever arm 1102 from being moved vertically, but allows lever arm 1102 to rotate at second end portion 1112.

Fulcrum 1106 is shown as being generally elongated in shape, having opposing first and second ends. Fulcrum 1106 may be made out of any suitable material, including plastic, metal, etc. through any suitable manufacturing method, including injection molding, stamping, etc. Fulcrum 1106 may include one or more features (e.g., tabs, slots) for position and orientation control of fulcrum 1106 in housing 1116. Lever arm 1102 is shown as being generally flat and "T" shaped. The cross-stroke of the "T" on the right end of lever arm 1102 serves to prevent lever arm 1102 from moving horizontally in tactile switch 1100 and may be removed or placed at any suitable location along the length of lever arm 1102. In other embodiments, lever arm 1102 and fulcrum 1106 may have other shapes, including being rounded, etc. In the example of FIGS. 11-14, button interposer 1104 contacts lever arm 1102 between the region where lever arm 1102 contacts fulcrum 1106 and the region where lever arm 1102 contacts dome switch 704. In other embodiments, the position of button interposer 1104 and dome switch 704 may be swapped such that dome switch 704 contacts lever arm 1102 between fulcrum 1106 and the region where button interposer 1104 contacts lever arm 1102.

Fulcrum 1106 has a handle 1108 that extends through second opening 610 in a surface of housing 1116 (e.g., when surface panel 602 is applied to the top of housing 1116 to form the enclosure of tactile switch 1100). Handle 1108 is externally accessible and configured to be moveable to slide fulcrum 1106 relative to second surface 1304 of lever arm 1102 to adjust the amount of actuation force for tactile switch 1100. Second opening 610 is rectangular, running along the side surface of housing 1116. In an embodiment, opposing sides of housing 1116 may each include an instance of second opening 610. As such, the first and second ends of fulcrum 1106 may each extend from a second opening 610 to be accessible as corresponding handles 1108.

When lever arm 1102 is positioned in housing 1116, second surface 1304 of lever arm 1102 contacts dome switch 704 at second end portion 1114, and contacts fulcrum 1106 at first end portion 1112. First surface 1302 of lever arm 1102 receives protrusion 1202 of inner surface 408 of button interposer 1104. Fulcrum 1106 holds first end portion 1112 in position, but allows second end portion 1114 of lever arm 1102 to be rotated downward in housing 1116 into dome switch 704 when button interposer 1104 is pressed, thereby causing dome switch 704 to be actuated. The position of fulcrum 1106 along lever arm 1102, as set by a user interacting with handle 1108, dictates the amount of force the user pressing button interposer 1104 has to apply to actuate dome switch 704.

For example, FIG. 13 shows tactile switch 1100 in a low actuation force position. In FIG. 13, handle 1108 has been slid as far left as possible, lengthening as much as possible the distance between fulcrum 1106 and the contact point between lever arm 1102 and dome switch 704 (at bump 706). In this configuration, the minimum force is required to press button interposer 1104, causing lever arm 1102 to pivot at fulcrum 1106, rotating lever arm 1102 into dome switch 704, and thereby actuating dome switch 704.

In contrast, FIG. 14 shows tactile switch 1100 in a high actuation force position. In FIG. 14, handle 1108 has been slid as far right as possible, shortening as much as possible the distance between fulcrum 1106 and the contact point between lever arm 1102 and dome switch 704 (at bump 706). In this configuration, the maximum force is required to press button interposer 1104, causing lever arm 1102 to pivot at fulcrum 1106, rotating lever arm 1102 into dome switch 704, and thereby actuating dome switch 704.

FIGS. 13 and 14 show extreme positions for handle 1108 (and fulcrum 1106) for purposes of illustration. Using handle 1108, a user may position lever arm 1102 at the positions of FIG. 13 or 14, or any position in between, to set a corresponding actuation force for tactile switch 1100. The further right (in FIGS. 13 and 14) that handle 1108 is slid, the shorter the distance between fulcrum 1106 and the contact point between lever arm 1102 and dome switch 704, and therefore the higher the required actuation force. The further left that handle 1108 is slid, the longer the distance between fulcrum 1106 and the contact point between lever arm 1102 and dome switch 704, and therefore the lower the required actuation force. If the position of button interposer 1104 and dome switch 704 is swapped relative to fulcrum 1106 as described above, the reverse is true (i.e. moving fulcrum 1106 to the left increases activation force and moving fulcrum 1106 to the right decreases activation force).

Figure 15:
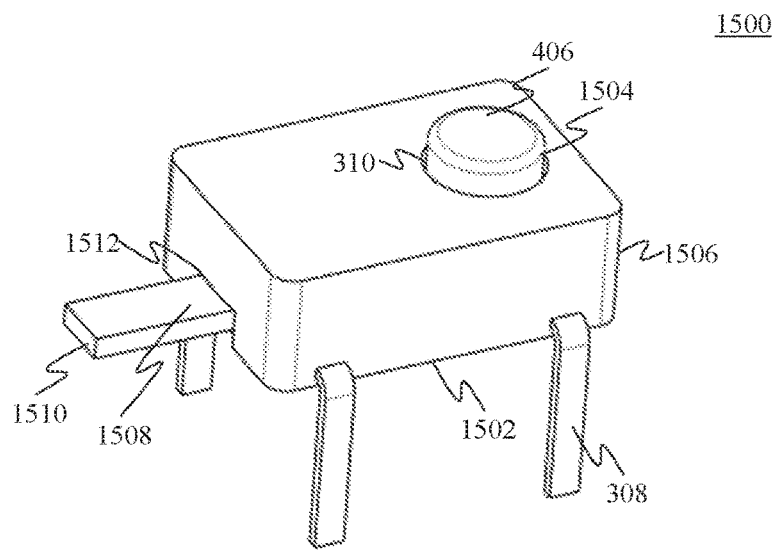
FIG. 15 shows a perspective view of a tactile switch configured with a slideable fulcrum and flipped dome switch for adjustment of switch actuation force, according to an example embodiment.
Figure 16:
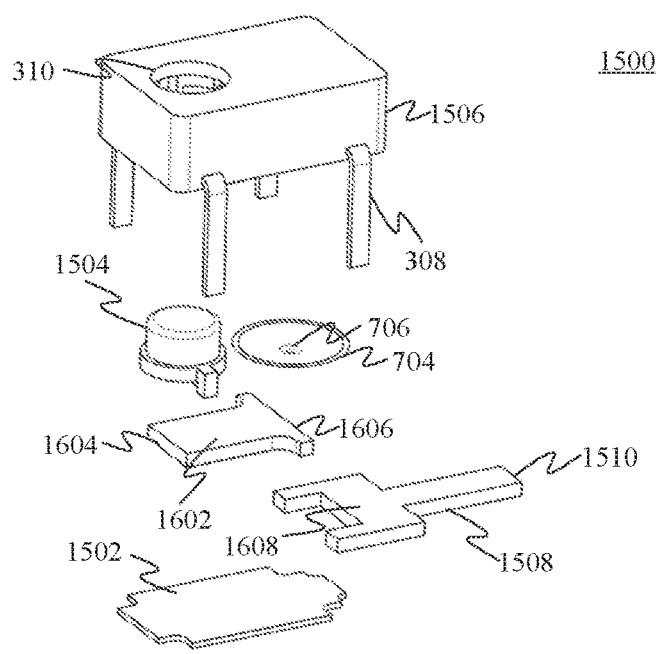
FIG. 16 shows an exploded view of the tactile switch of FIG. 15, according to an example embodiment.
Figure 17:
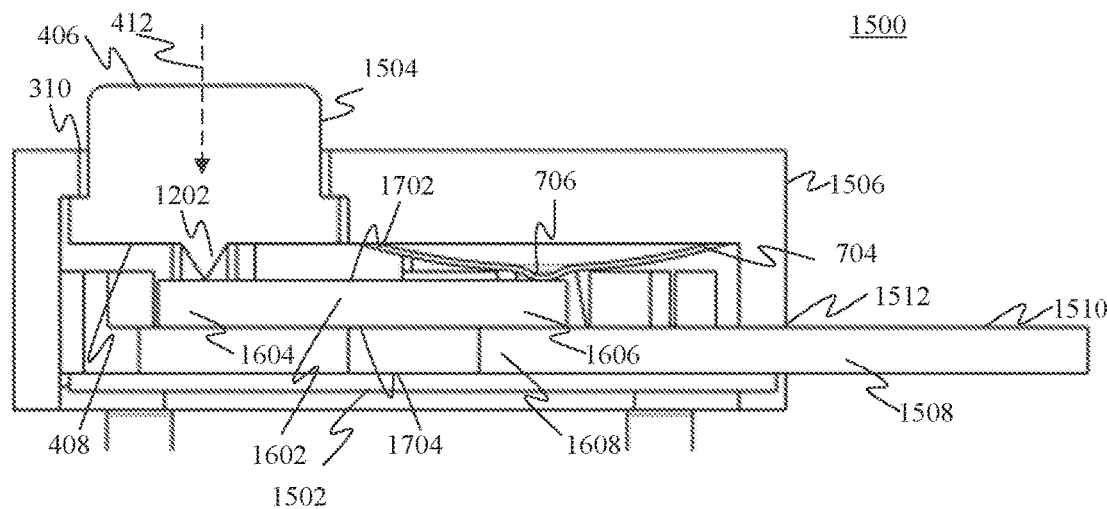
FIGS. 17 and 18 show cross-sectional views of the tactile switch of FIG. 15 with fulcrum in low and high actuation force positions, respectively, according to example embodiments.
Figure 18:
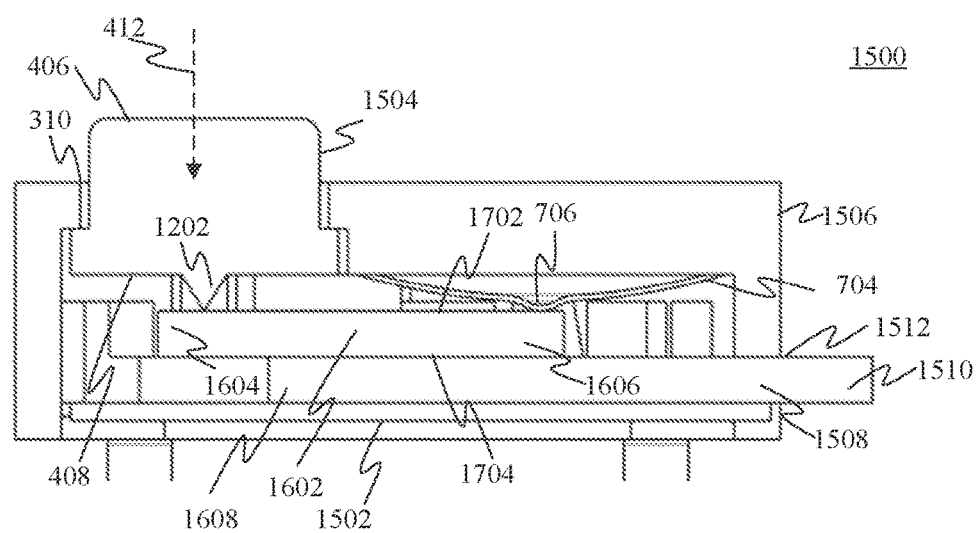

C. Example Sliding Lever Embodiments for Enabling Actuation Force Adjustment, with Inverted Dome Switch In embodiments, FAM 312 (FIGS. 3-5) may include a slideable fulcrum, and a dome switch that is inverted (relative to the configuration of FIGS. 15-18), to enable the actuation force of tactile switch 300 to be set to a range of actuation forces. For instance, FIGS. 15-18 show views related to a tactile switch 1500 configured with a slideable fulcrum and flipped dome switch for adjustment of switch actuation force, according to an example embodiment. FIG. 15 shows a perspective view, and FIG. 16 shows an exploded view of tactile switch 1500. FIGS. 17 and 18 show cross-sectional views of tactile switch 1500 with fulcrum in low and high actuation force positions, respectively. In embodiments, tactile switch 1500 may be configured according to flowchart 200 of FIG. 2A, and step 208 of FIG. 2B. FIGS. 15-18 are described as follows.

As shown in FIGS. 15 and 16, tactile switch 1500 includes a surface panel 1502, a button interposer 1504, a housing 1506 (surface panel 1502 may be considered part of housing 1506 in some embodiments), a slideable fulcrum 1508, a lever arm 1602, and dome switch 704. Button interposer 1504 is generally "hat" shaped, having opposing outer and inner surfaces 406 and 408. Outer surface 408 extends through an opening 310 in surface panel 1502 to be outside/external, and forms the "top" of the "hat" shape. Inner surface 408 is contained inside housing 1506, forming the "bottom" or "brim" of the "hat" shape. As shown in FIGS. 17 and 18, inner surface 408 of button interposer 1504 may include protrusion 1202, having any suitable cross-sectional shape (e.g., triangular or pointed, rounded).

Button interposer 1504 may have other shapes than shown in FIGS. 15-18, and may be made out of any suitable material (e.g., plastic, metal, etc.) according to any suitable manufacturing process (e.g., injection molding, etc.). For example, as shown in FIG. 16, button interposer 1504 may have flanges that extend from opposing first and second sides of a lower portion of button interposer (at inner surface 408). As shown in FIG. 16, the flanges bend downward. The flanges are used to interface button interposer 1504 with housing 1506 (e.g., the interior cavity of housing 1506 may have slots into which the flanges insert). Housing 1506 may be formed similarly to housing 306 (FIG. 3) described above, and may have one or more legs 308 described above.

Lever arm 1602 has first and second end portions 1604 and 1606, and opposing first and second surfaces 1702 and 1704 (FIGS. 17 and 18). Lever arm 1602 may be made out of any suitable material, including plastic, metal, etc. through any suitable manufacturing method, including injection molding, stamping, etc. First surface 1702 of lever arm 1602 receives optional protrusion 1202 of inner surface 408 of button interposer 1504 at first end portion 1604, and contacts dome switch 704 (at bump 706) at second end portion 1606. In some embodiments, button interposer 1504 may be rigidly attached to lever arm 1602. In some such embodiments, button interposer 1504 and lever arm 1602 may be formed as a single part. Second surface 1704 of lever arm 1602 contacts fulcrum 1508. Fulcrum 1508 is held from being moved vertically in tactile switch 1500.

Fulcrum 1508 is shown as being flat and generally having a squared "Y" shape, but in other embodiments may have other shapes (e.g., an "L" shape, a "T" shape, a rectangular shape). Fulcrum 1508 may include one or more features (e.g., tabs, slots) for position and orientation control of fulcrum 1508 in housing 1506. In the example of FIG. 16, the cross-bar of the squared "Y" shape is a pivot region 1608 against which lever arm 1602 pivots. Fulcrum 1508 may be made out of any suitable material, including plastic, metal, etc. through any suitable manufacturing method, including injection molding, stamping, etc. Lever arm 1602 is shown as being generally flat and "T" shaped. The cross-stroke of the "T" on the right end of lever arm 1602 serves to prevent lever arm 1602 from moving horizontally in tactile switch 1500 and may be removed or placed at any suitable location along the length of lever arm 1602. In other embodiments, lever arm 1602 may have other shapes, including being rounded, etc.

Fulcrum 1508 has a handle 1510 that extends through second opening 1512 in a surface of housing 1506 (e.g., formed when surface panel 1502 is applied to the bottom of housing 1506 to form the enclosure of tactile switch 1500). Handle 1510 is externally accessible and configured to be moveable to slide fulcrum 1508 relative to second surface 1704 of lever arm 1602 to adjust the amount of actuation force for tactile switch 1500. Second opening 1512 is rectangular, and is positioned at an end of housing 1506. Accordingly, handle 1510 extends from the end of housing 1506. A user may pull on handle 1510 to extend further outside housing 1506, sliding fulcrum 1508 towards second opening 1512, or may push on handle 1510 to slide fulcrum 1508 further inside housing 1506 and away from second opening 1512.

Note that in any embodiments described herein, side, top, bottom, and/or end openings may be present, through which handles extend for sliding lever arms and/or fulcrums. Furthermore, any such handles may be rigidly or movably attached to their respective sliding lever arms and/or fulcrums in any suitable manner provided the handles can be moved to adjust the position of the lever arms and/or fulcrums. In some embodiments, handles may manipulate and/or be attached to their respective lever arms and/or fulcrums through one or more intermediate components.

When lever arm 1602 is positioned in housing 1506, first surface 1702 of lever arm 1602 contacts dome switch 704 at second end portion 1606, and receives protrusion 1202 of inner surface 408 of button interposer 1504 at first end portion 1604. Second surface 1704 of lever arm 1602 contacts fulcrum 1508 at pivot region 1608. When button interposer 1504 is pressed, lever arm 1602 pivots where lever arm 1602 contacts pivot region 1608 of fulcrum 1508. In such situation, first end portion 1604 of lever arm 1604 tilts downward, while second end portion 1606 of lever arm tilts upward into dome switch 704, thereby causing dome switch 704 to be actuated. The position of pivot region 1608 of fulcrum 1508 along lever arm 1602, as set by a user interacting with handle 1510, dictates the amount of force the user pressing button interposer 1504 has to apply to actuate dome switch 704.

For example, FIG. 17 shows tactile switch 1500 in a low actuation force position. In FIG. 17, handle 1510 has been slid as far right as possible, shortening as much as possible the distance between pivot region 1608 of fulcrum 1508 and the contact point between lever arm 1602 and dome switch 704 (at bump 706), and lengthening as much as possible the distance between pivot region 1608 and the contact point of button interposer 1504 with first end portion 1604 of lever arm 1602. In this configuration, the minimum force is required to press button interposer 1504, causing lever arm 1602 to pivot at pivot region 1608, rotating second end portion 1606 of lever arm 1602 into dome switch 704, thereby actuating dome switch 704.

In contrast, FIG. 18 shows tactile switch 1500 in a high actuation force position. In FIG. 18, handle 1510 has been slid as far left as possible, lengthening as much as possible the distance between pivot region 1608 of fulcrum 1508 and the contact point between lever arm 1602 and dome switch 704 (at bump 706), and shortening as much as possible the distance between pivot region 1608 and the contact point of button interposer 1504 with first end portion 1604 of lever arm 1602. In this configuration, the maximum force is required to press button interposer 1504, causing lever arm 1602 to pivot at pivot region 1608, rotating second end portion 1606 of lever arm 1602 into dome switch 704, thereby actuating dome switch 704.

FIGS. 17 and 18 show extreme positions for handle 1510 (and fulcrum 1508) for purposes of illustration. Using handle 1510, a user may position pivot region 1608 of lever arm 1602 at the positions of FIG. 17 or 18, or any position in between, to set a corresponding actuation force for tactile switch 1500. The further right (in FIGS. 17 and 18) that handle 1510 is slid, the longer the distance between pivot region 1608 and the contact point between lever arm 1602 and button interposer 1504 (protrusion 1202), and therefore the lower the required actuation force. The further left that handle 1510 is slid, the shorter the distance between pivot region 1608 and the contact point between lever arm 1602 and button interposer 1504, and therefore the higher the required actuation force.

D. Example Rotating Button Embodiments for Enabling Actuation Force Adjustment

Figure 19:
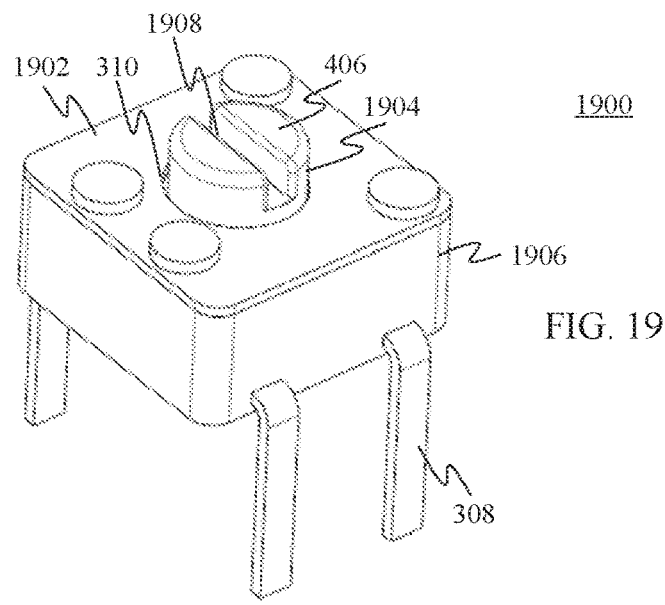
FIG. 19 shows a perspective view of a tactile switch configured with a rotatable button interposer for adjustment of switch actuation force, according to an example embodiment.
Figure 20:
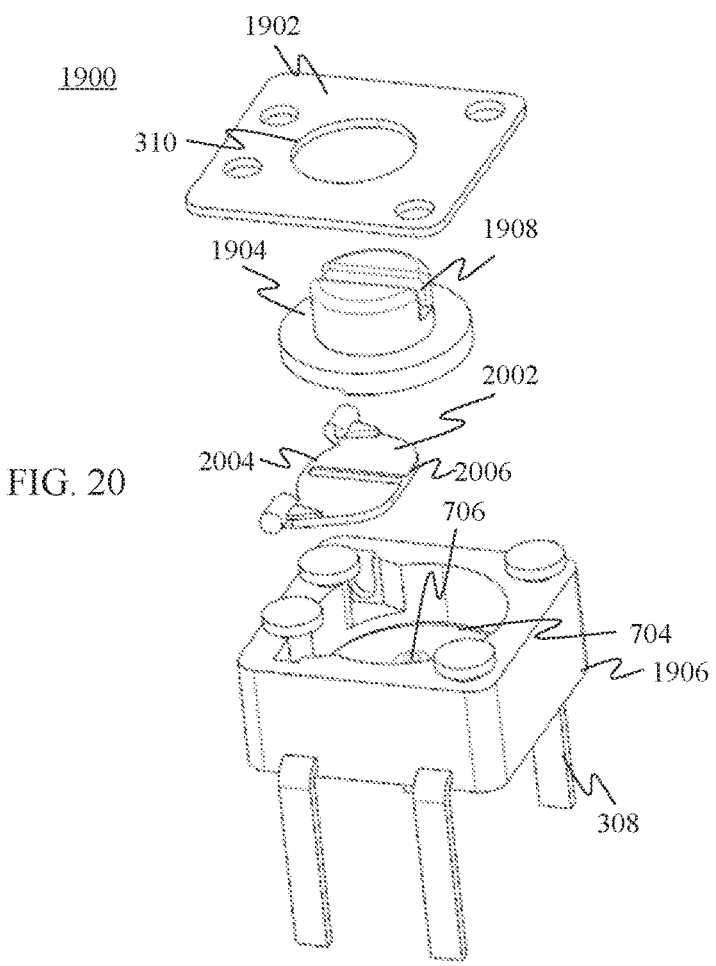
FIG. 20 shows an exploded view of the tactile switch of FIG. 19, according to an example embodiment.
Figure 21:
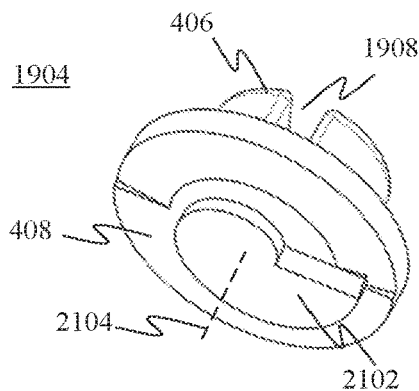
FIG. 21 shows a perspective view of the button interposer of the tactile switch of FIG. 19, according to an example embodiment.
Figure 22:
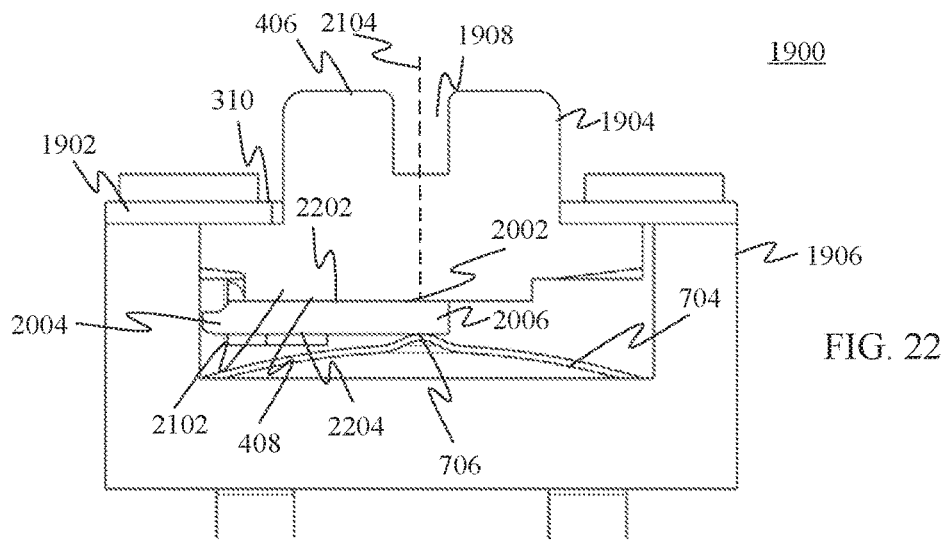
FIGS. 22 and 23 show cross-sectional views of the tactile switch of FIG. 19 with button rotated in high and low actuation force positions, respectively, according to example embodiments.
Figure 23:
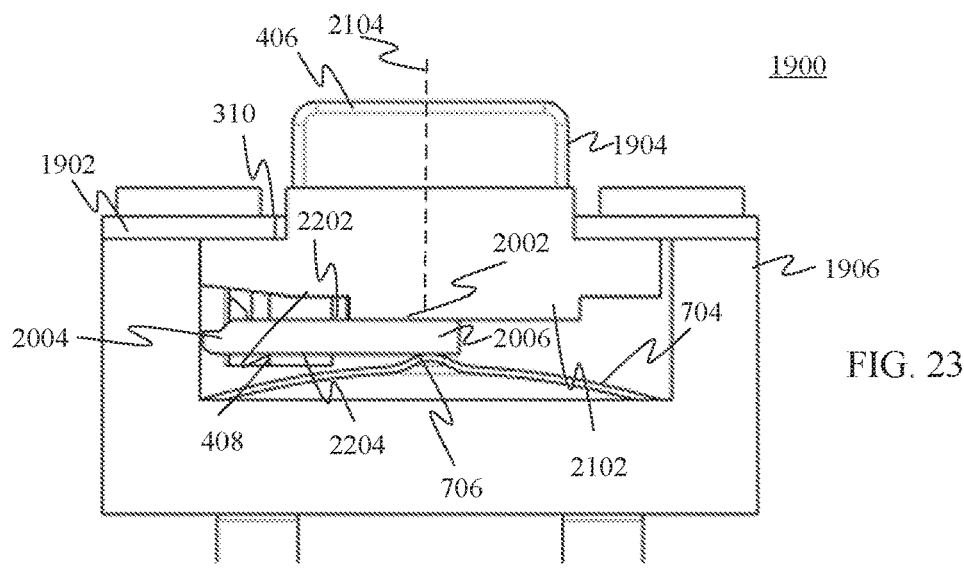

In embodiments, FAM 312 (FIGS. 3-5) may include a rotatable button used to adjust the actuation force of tactile switch 300 among a range of possible actuation forces. For instance, FIGS. 19-23 show views related to a tactile switch 1900 configured with a rotatable button for adjustment of switch actuation force, according to an example embodiment. FIG. 19 shows a perspective view, and FIG. 20 shows an exploded view of tactile switch 1900. FIG. 21 shows a perspective view of an example button interposer 1904 of tactile switch 1900. FIGS. 22 and 23 show cross-sectional views of tactile switch 1900 in high and low force button positions, respectively. In embodiments, tactile switch 1900 may be configured according to flowchart 200 of FIG. 2A, and step 210 of FIG. 2B. FIGS. 19-23 are described as follows.

As shown in FIGS. 19 and 20, tactile switch 1900 includes a surface panel 1902, a rotatable button interposer 1904, a housing 1906 (surface panel 1902 may be considered part of housing 1906 in some embodiments), a lever body 2002 (FIG. 20), and dome switch 704 (FIG. 20). Button interposer 1904 is generally "hat" shaped, having opposing outer and inner surfaces 406 and 408. Outer surface 408 extends through an opening 310 in surface panel 1902 to be outside/external, and forms the "top" of the "hat" shape. Inner surface 408 is contained inside housing 1906, forming the "bottom" or "brim" of the "hat" shape.

As shown in FIGS. 21-23, inner surface 408 of button interposer 1904 may include a protrusion 2102 that curves around an axis 2104 of button interposer 1904 with a non-uniform radial distance from axis 2104. As shown in FIG. 21, protrusion 2102 may be curved or spiral, although in other embodiments, protrusion 2102 may have other shapes. Protrusion 2102 is configured to have a radial distance (radius) that varies around axis 2104 so that for each rotational position of button interposer 1904, protrusion 2102 provides a corresponding, different radial width, and therefore a different contact point with lever body 2002, thereby providing a different pivot point, and therefore a different actuation force for actuating tactile switch 1900. In an alternative implementation, protrusion 2102 may comprise one or more eccentric bumps or nubs or one or more radial spokes. In such an implementation, for each rotational position the contact point of protrusion 2102 with lever body 2002 changes providing a different pivot point and actuation force.

Furthermore, as shown in FIGS. 19-22, outer surface 408 of button interposer 1904 includes a slot 1908. Slot 1908 is an engagement feature for a tool, such as a screwdriver (standard type), that may be used to rotate button interposer 1904 on axis 2104. Other types of engagement features may be present instead of slot 1908, including a cross-slot (for Phillips screwdriver), a hexagonal socket (for a hex key), a bolt head, etc. In another embodiment, button interposer 1908 may be configured with a grip that enables a user to grasp and turn button interposer 1904, to set button interposer 1904 to have any desired rotational position. In still another embodiment, no engagement feature may be present.

Button interposer 1904 may have other shapes than shown in FIGS. 19-23, and may be made out of any suitable material (e.g., plastic, metal, etc.) according to any suitable manufacturing process (e.g., injection molding, etc.). Housing 1906 may be formed similarly to housing 306 (FIG. 3) described above, and may have one or more legs 308 described above.

Lever body 2002 has a pivot end 2004 and a second end portion 2006, and opposing first and second surfaces 2202 and 2204 (FIGS. 22 and 23). Lever body 2002 may be made out of any suitable material, including plastic, metal, etc. through any suitable manufacturing method, including injection molding, stamping, etc. Lever body 2002 is shown as being generally flat and "D" shaped. In other embodiments, lever body 2002 may have other shapes, including being rounded, rectangular, "T" shaped, elongated, etc. As shown in FIG. 20, pivot end 2004 has co-axial cylindrical portions extending from opposing first and second sides of pivot end 2004. Pivot end 2004 is held from moving vertically in housing 1906, but can pivot (e.g., on the cylindrical portions), thereby enabling second end portion 2006 of lever body 2002 to be rotated downward in housing 1906 into dome switch 704 when button interposer 1904 is pressed, thereby causing dome switch 704 to be actuated.

First surface 2202 of lever body 2002 receives protrusion 2102 of button interposer 1904 at a location that depends on the rotational position of button interposer 1904. Second surface 2204 of lever body 2002 contacts dome switch 704 (at bump 706) at second end portion 2006. When button interposer 1904 is pressed, lever arm 2002 pivots into dome switch 704. The rotational position of button interposer 1904 causes a corresponding portion of the curve shaped of protrusion 2102 to be received by first surface 2202 of lever body 2002, setting the amount of the force required to press button interposer 1904, cause second end portion 2006 of lever body 2002 to rotate down into dome switch 704, and actuate dome switch 704.

For example, FIG. 22 shows tactile switch 1900 in a high actuation force position. In FIG. 22, button interposer 1904 has been rotated such that the radially outermost point of protrusion 2102 (measured from axis 2104) contacts first surface 2202 of lever body 2002 (near pivot end 2004), shortening as much as possible the distance between pivot end 2004 and the contact point between protrusion 2102 and lever body 2002. In this configuration, the maximum force is required to press button interposer 1904 into lever body 2002, causing lever body 2002 to pivot at pivot end 2004, rotating second end portion 2006 of lever body 2002 into dome switch 704, thereby actuating dome switch 704.

In contrast, FIG. 23 shows tactile switch 1900 in a low actuation force position. In FIG. 23, button interposer 1904 has been rotated such that the radially innermost point of protrusion 2102 contacts first surface 2202 of lever body 2002 (near the middle of lever body 2002), lengthening as much as possible the distance between pivot end 2004 and the contact point between protrusion 2102 and lever body 2002. In this configuration, the minimum force is required to press button interposer 1904 into lever body 2002, causing lever body 2002 to pivot at pivot end 2004, rotating second end portion 2006 of lever body 2002 into dome switch 704, thereby actuating dome switch 704.

FIGS. 22 and 23 show extreme rotational positions for button interposer 1904 for purposes of illustration. By rotating button interposer 1904, a user may position the fulcrum or pivot point (the contact point between protrusion 2102 and lever body 2002) at the positions of FIG. 22 or 23, or any position in between, to set a corresponding actuation force for tactile switch 1900.

E. Example Off-Center Rotating Button Embodiments for Enabling Actuation Force Adjustment As described in the preceding subsection, FAM 312 (FIGS. 3-5) may include a rotatable button used to adjust the actuation force of tactile switch 300 among a range of possible actuation forces. In the embodiments of the preceding subsection, the rotatable button and dome switch were substantially co-axial. In further embodiments, FAM 312 (FIGS. 3-5) may include a rotatable button that is not-co-axial with the dome switch, and is used to adjust actuation force.

Figure 24:
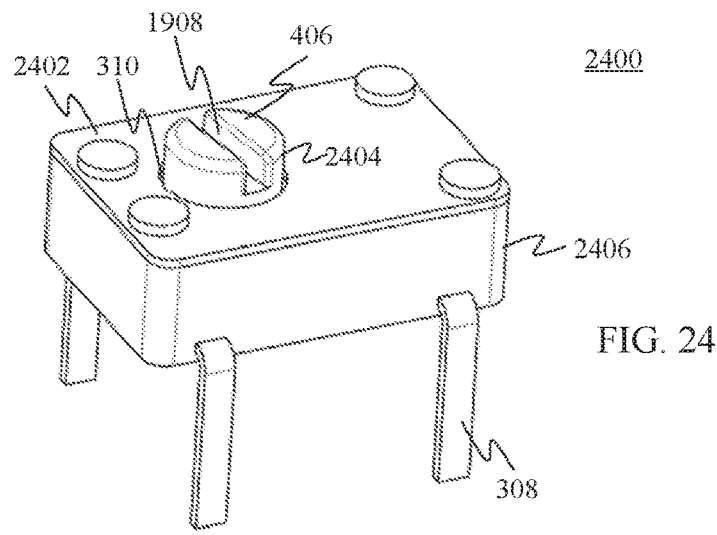
FIG. 24 shows a perspective view of a tactile switch configured with an off-center, rotatable button interposer for adjustment of switch actuation force, according to an example embodiment.
Figure 25:
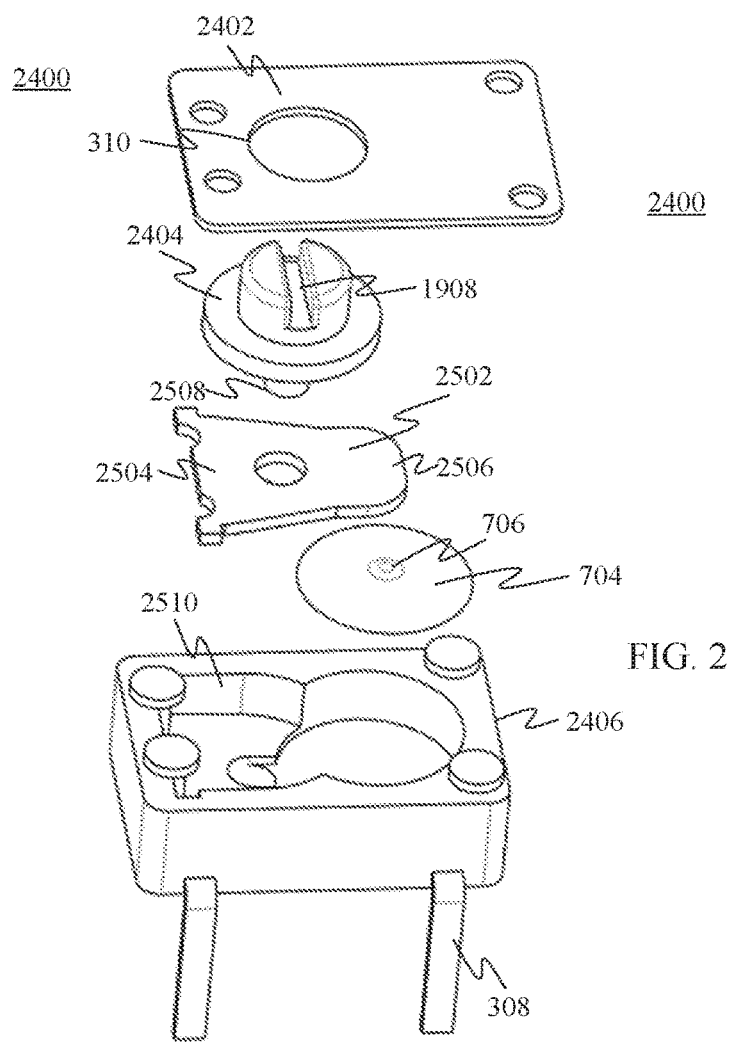
FIG. 25 shows an exploded view of the tactile switch of FIG. 24, according to an example embodiment.
Figure 26:
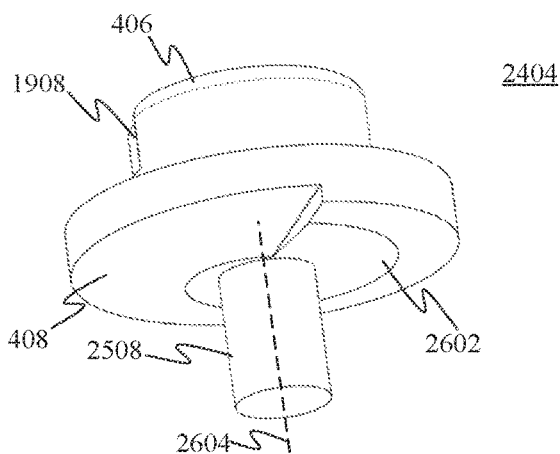
FIG. 26 shows a perspective view of the button interposer of the tactile switch of FIG. 25, according to an example embodiment.
Figure 27:
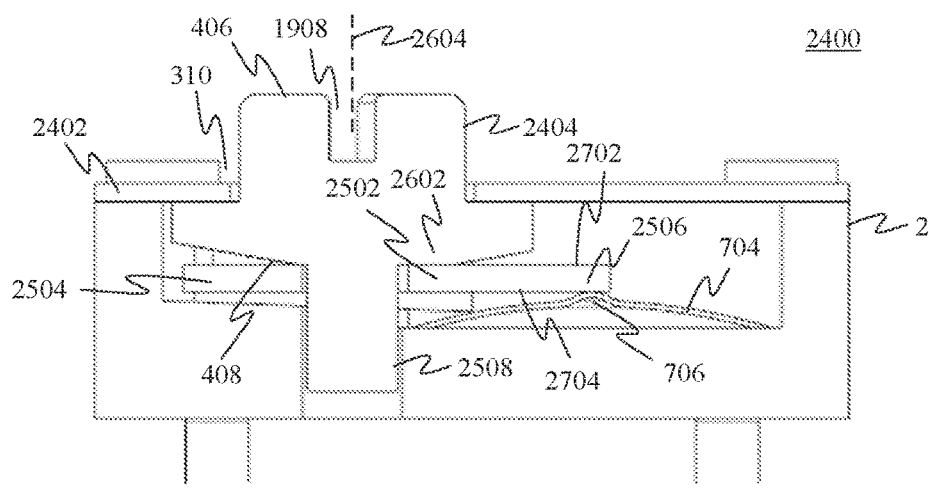
FIGS. 27 and 28 show cross-sectional views of the tactile switch of FIG. 24 with button rotated in low and high actuation force positions, respectively, according to example embodiments.
Figure 28:
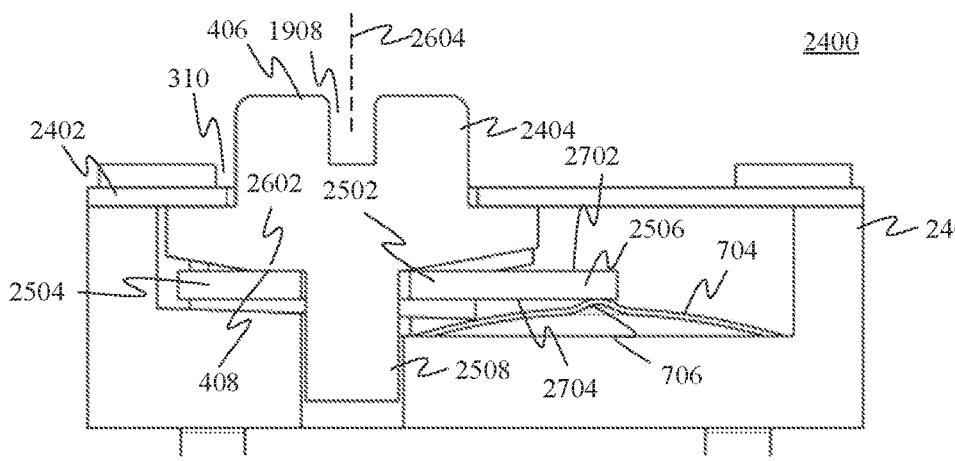

For instance, FIGS. 24-28 show views related to a tactile switch 2400 configured with an off-center, rotatable button for adjustment of switch actuation force, according to an example embodiment. FIG. 24 shows a perspective view, and FIG. 25 shows an exploded view of tactile switch 2400. FIG. 26 shows a perspective view of an example button interposer 2404 of tactile switch 2400. FIGS. 27 and 28 show cross-sectional views of tactile switch 2400 in low and high force button positions, respectively. In embodiments, tactile switch 2400 may be configured according to flowchart 200 of FIG. 2A, and step 210 of FIG. 2B. FIGS. 24-28 are described as follows.

As shown in FIGS. 24 and 25, tactile switch 2400 includes a surface panel 2402, a rotatable button interposer 2404, a housing 2406 (surface panel 2402 may be considered part of housing 2406 in some embodiments), a lever body 2502 (FIG. 25), and dome switch 704 (FIG. 25). In the embodiment of FIGS. 24-28, an axis of button interposer 2404 is offset from an axis of dome switch 704.

Button interposer 2404 is generally "hat" shaped, having opposing outer and inner surfaces 406 and 408. Outer surface 408 extends through an opening 310 in surface panel 2402 to be outside/external, and forms the "top" of the "hat" shape. Inner surface 408 is contained inside housing 2406, forming the "bottom" or "brim" of the "hat" shape.

As shown in FIGS. 25-28, inner surface 408 of button interposer 2404 may include a protrusion 2602 that curves around an axis 2604 of button interposer 2404 with a non-uniform radial distance from axis 2604. As shown in FIG. 26, protrusion 2602 may be curved or spiral, although in other embodiments, protrusion 2602 may have other shapes. Protrusion 2602 is configured to have a radial distance (radius) that varies around axis 2604 so that for each rotational position of button interposer 2404, protrusion 2602 provides a corresponding, different radial width, and therefore a different contact point, with lever body 2502, thereby providing a different pivot point, and therefore a different actuation force for actuating tactile switch 2400. In an alternative implementation, protrusion 2602 may comprise one or more eccentric bumps or nubs or one or more radial spokes. In such an implementation, for each rotational position the contact point of protrusion 2602 with lever body 2502 changes providing a different pivot point and actuation force.

Furthermore, button interposer 2404 has a cylindrical member 2508 that is co-axial with protrusion 2602, and extends from protrusion 2602 (at inner surface 408). Cylindrical member 2508 is configured to insert through an opening through lever body 2502 (adjacent to the position of dome switch 704 in housing 2406), into a corresponding cylindrical slot in housing 2406. Cylindrical member 2508 maintains the position of button interposer 2404 in housing 2406, while allowing button interposer 2404 to be rotated. In another embodiment, a cylindrical member may extend from button interposer 2404 into a cylindrical slot in housing 2406 to accomplish the same purpose. In yet another embodiment, no such additional alignment features may exist.

Still further, as shown in FIGS. 24-28, outer surface 408 of button interposer 2404 includes a slot 1908. As described above in the previous subsection, slot 1908 is an engagement feature for a tool, such as a screwdriver (standard type), that may be used to rotate button interposer 2404 on axis 2604. Other types of engagement features may be present instead of slot 1908, as mentioned elsewhere herein or otherwise known, or no engagement feature may be present.

Button interposer 2404 may have other shapes than shown in FIGS. 24-28, and may be made out of any suitable material (e.g., plastic, metal, etc.) according to any suitable manufacturing process (e.g., injection molding, etc.). Housing 2406 may be formed similarly to housing 306 (FIG. 3) described above, and may have one or more legs 308 described above.

Lever body 2502 has a pivot end 2504 and a second end portion 2506, and opposing first and second surfaces 2702 and 2704 (FIGS. 27 and 28). Lever body 2502 may be made out of any suitable material, including plastic, metal, etc. through any suitable manufacturing method, including injection molding, stamping, etc. Lever body 2502 is shown as being generally flat and "D" shaped. In other embodiments, lever body 2502 may have other shapes, including being rounded, rectangular, "T" shaped, elongated, etc. As shown in FIG. 25, pivot end 2504 has co-axial portions extending from opposing first and second sides of pivot end 2504. Pivot end 2504 is held from moving vertically in housing 2406, but can pivot (e.g., on the co-axial portions), thereby enabling second end portion 2506 of lever body 2502 to be rotated downward in housing 2406 into dome switch 704 when button interposer 2404 is pressed, thereby causing dome switch 704 to be actuated.

First surface 2702 of lever body 2502 receives protrusion 2602 of button interposer 2404 at a location that depends on the rotational position of button interposer 2404. Second surface 2704 of lever body 2502 contacts dome switch 704 (at bump 706) at second end portion 2506. When button interposer 2404 is pressed, lever arm 2502 pivots into dome switch 704. The rotational position of button interposer 2404 causes a corresponding portion of the curve shaped of protrusion 2602 to be received by first surface 2702 of lever body 2502, setting the amount of the force required to press button interposer 2404, cause second end portion 2506 of lever body 2502 to rotate down into dome switch 704, and actuate dome switch 704.

For example, FIG. 27 shows tactile switch 2400 in a low actuation force position. In FIG. 27, button interposer 2404 has been rotated such that protrusion 2602 contacts first surface 2702 of lever body 2502 as far right as possible (near the middle of lever body 2502), lengthening as much as possible the distance between pivot end 2504 and the contact point between protrusion 2602 and lever body 2502. In this configuration, the minimum force is required to press button interposer 2404 into lever body 2502, causing lever body 2502 to pivot at pivot end 2504, rotating second end portion 2506 of lever body 2502 into dome switch 704, thereby actuating dome switch 704.

In contrast, FIG. 28 shows tactile switch 2400 in a high actuation force position. In FIG. 28, button interposer 2404 has been rotated such that protrusion 2602 contacts first surface 2702 of lever body 2502 as far left as possible (near pivot end 2504), shortening as much as possible the distance between pivot end 2504 and the contact point between protrusion 2602 and lever body 2502. In this configuration, the maximum force is required to press button interposer 2404 into lever body 2502, causing lever body 2502 to pivot at pivot end 2504, rotating second end portion 2506 of lever body 2502 into dome switch 704, thereby actuating dome switch 704.

FIGS. 27 and 28 show extreme rotational positions for button interposer 2404 for purposes of illustration. By rotating button interposer 2404, a user may position the fulcrum or pivot point (the contact point between protrusion 2602 and lever body 2502) at the positions of FIG. 27 or 28, or any position in between, to set a corresponding actuation force for tactile switch 2400.

Note that in another embodiment, rather than the rotatable button interposer being shaped with a protrusion to enable adjustment of actuation force, a lever body of the tactile switch may be rotatable, and patterned to enable adjustment of actuation force.

Figure 29:
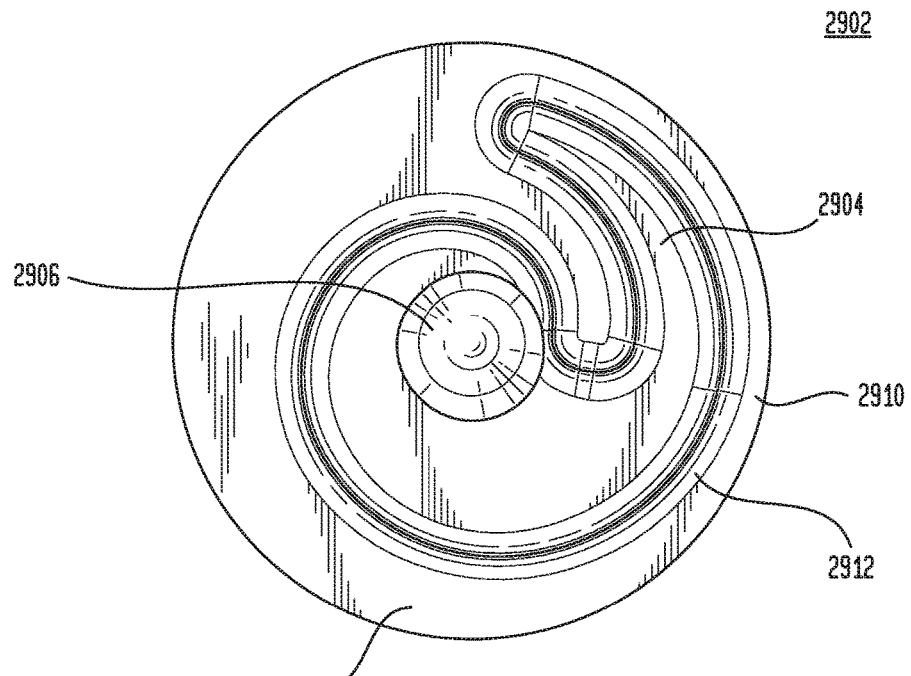
FIG. 29 shows a bottom view of a lever with spiral protrusion, according to an example embodiment.
Figure 30:
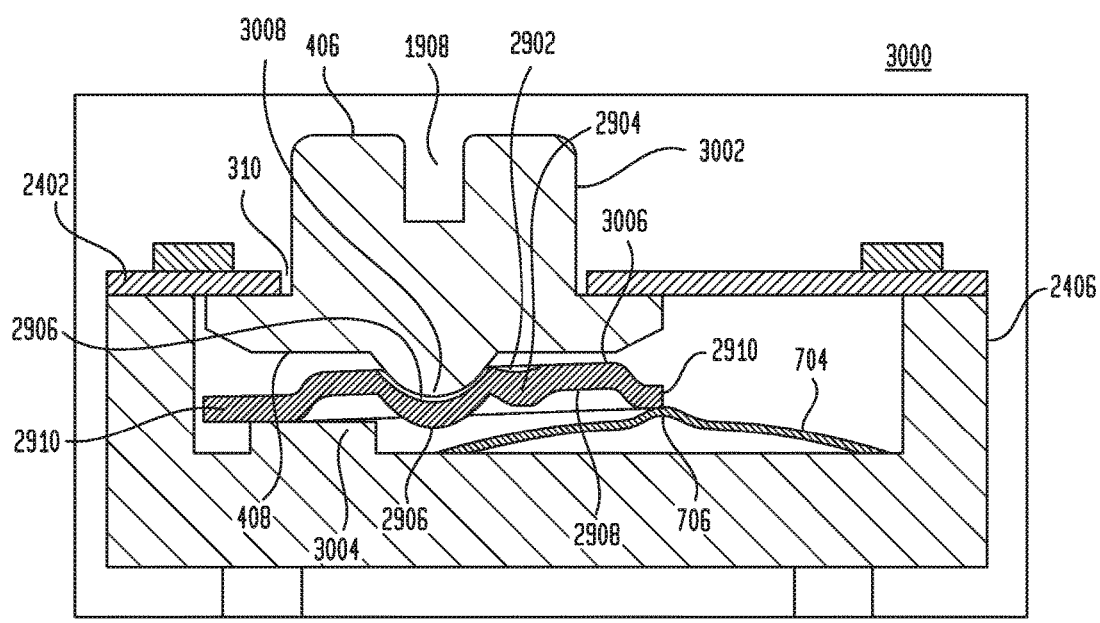
FIG. 30 shows a cross-sectional view of a tactile switch similar to that of FIGS. 27 and 28, with the lever of FIG. 29, according to an example embodiment.

For example, FIG. 29 shows a bottom view of a rotatable lever body 2902 with a spiral depression 2904, according to an example embodiment. Furthermore, FIG. 30 shows a cross-sectional view of a tactile switch 3000 that includes lever body 2902, according to an example embodiment. Tactile switch 3000 is generally similar to tactile switch 2400 of FIG. 24, with differences described as follows.

As shown in FIG. 30, tactile switch 3000 includes a surface panel 2402, a rotatable button interposer 3002, a housing 2406, lever body 2902, and dome switch 704 (FIG. 25). Button interposer 3002 is generally "hat" shaped, having opposing outer and inner surfaces 406 and 408. Outer surface 408 extends through an opening 310 in surface panel 2402 to be outside/external, and forms the "top" of the "hat" shape. Inner surface 408 is contained inside housing 2406, forming the "bottom" or "brim" of the "hat" shape.

As shown in FIG. 30, inner surface 408 of button interposer 3002 may include a mating feature 3008. Mating feature 3008 may have any cross-sectional shape, including rounded (a bump or nub, as in FIG. 30), pointed (e.g., triangular), or other shape. Mating feature 3008 may extend towards (as in FIG. 30) or away from lever body 2902 to mate with a corresponding shaped (concave or convex) mating feature 2906 in the center of lever body 2902. This mating maintains an alignment between button interposer 3002 and lever body 2902, and causes lever body 2902 to rotate when button interposer 3002 is rotated.

Still further, as shown in FIG. 30, outer surface 408 of button interposer 3002 includes slot 1908. As described above in the previous subsections, slot 1908 is an engagement feature for a tool, such as a screwdriver (standard type), that may be used to rotate button interposer 3002 on its axis. Other types of engagement features may be present instead of slot 1908, as mentioned elsewhere herein or otherwise known, or no engagement feature may be present.

Button interposer 3002 may have other shapes than shown in FIG. 30, and may be made out of any suitable material (e.g., plastic, metal, etc.) according to any suitable manufacturing process (e.g., injection molding, etc.).

Housing 2406 is configured to house lever body 2902, dome switch 704, and a portion of button interposer 3002, in a similar fashion as described in prior subsections. Furthermore, housing 2406 includes a stationary fulcrum 3004 on a bottom, inner surface. Fulcrum 3004 can have any shape, including being rectangular (as in FIG. 30), rounded, pointed, etc.

Lever body 2902 operates as a lever in tactile switch 3000, similar to lever body 2502 (FIG. 25), as well as operating to adjust actuation force, similar to protrusion 2602 (FIG. 26). Lever body 2902 includes opposing first and second surfaces 3006 and 2908. As shown in FIG. 29, lever body 2902 is circular in shape, and generally flat, except for centrally positioned mating feature 2906 and depression 2904, which is curved or spiral shaped, curving around an axis of lever body 2902. Depression 2904 is a recessed pattern in second surface 2908. Depression 2904 has an outer edge 2912 that has a non-uniform radial distance from a perimeter edge 2910 of second surface 2908 of lever body 2902. Lever body 2902 may be made out of any suitable material, including plastic, metal, etc. through any suitable manufacturing method, including injection molding, stamping, etc. Dome switch 704 is in contact with second surface 2908 of lever body 2902 at perimeter edge 2910.

During operation, mating feature 2906 in lever body 2902 receives mating feature 3008 of button interposer 3002. Outer edge 2912 of depression 2904 contacts stationary fulcrum 3004. The position of outer edge 2912 around depression 2904 that is received by fulcrum 3004 is determined by the rotational position of button interposer 2404, which determines the rotational position of lever body 2902. Perimeter edge 2910 of second surface 2908 of lever body 2902 contacts dome switch 704 (at bump 706). When button interposer 3002 is pressed, lever arm 2902 pivots against fulcrum 3004 at outer edge 2912 into dome switch 704. The rotational position of button interposer 2404 causes a corresponding portion of the curve shaped of outer edge 2912 to be received by fulcrum 3004, setting a lever length (from the pivot point of outer edge 2912 to the portion of perimeter edge 2910 in contact with dome switch 704) which controls the amount of the force required to press button interposer 3002, and actuate dome switch 704. By rotating button interposer 2902, a corresponding portion of outer edge 2914 of depression 2904 is moved into position to be a pivot for lever body 2902 against fulcrum 3004, thereby adjusting the amount of the force to a corresponding amount.

Note that depression 2904, as well as protrusion 2102 (FIG. 21) and protrusion 2602 (FIG. 26), may be shaped in any suitable manner to have non-uniform radial distances/widths, including being curved, having linear shapes/edges, having separate segments or being continuous, etc.

IV. Example Embodiments

In one embodiment, a tactile switch comprises: a housing; a button interposer; a dome switch contained in the housing that is configured to be actuated by pressing the button interposer; and an adjustment mechanism contained at least partially in the housing that is configured to enable an amount of force used to press the button interposer to actuate the dome switch to be adjusted.

In an embodiment, the adjustment mechanism includes a slideable lever body, the lever body comprising: a pivot end; a lever arm that extends from the pivot end and has opposing first and second surfaces, such that the first surface of the lever arm receives a surface of the button interposer, and the second surface of the lever arm is coupled to the dome switch; and a handle that extends from the lever body through an opening in a surface of the housing, and is configured to be moveable to slide the lever body to adjust the amount of the force.

In an embodiment, the adjustment mechanism includes a lever arm and a slideable fulcrum.

In an embodiment, the lever arm has opposing first and second end portions and opposing first and second surfaces, such that the first surface of the lever arm receives a surface of the button interposer, the second surface of the lever arm at the first end portion contacts the fulcrum, and the second surface of the lever arm at the second end portion is coupled to the dome switch; and the fulcrum has a handle that extends through an opening in a surface of the housing, and is configured to be moveable to slide the fulcrum relative to the second surface of the lever arm to adjust the amount of the force.

In an embodiment, the lever arm has opposing first and second end portions and opposing first and second surfaces, such that the first surface of the lever arm at the first end portion receives a surface of the button interposer, the second surface of the lever arm contacts the fulcrum, and the first surface of the lever arm at the second end portion is coupled to the dome switch; and the fulcrum has a handle that extends through an opening in a surface of the housing, and is configured to be moveable to slide the fulcrum relative to the second surface of the lever arm to adjust the amount of the force.

In an embodiment, the button interposer is rotatable.

In an embodiment, a surface of the button interposer includes a curve shaped protrusion that curves around an axis of the button interposer with a non-uniform radial distance from the axis; the adjustment mechanism includes a lever body that includes a pivot end and a second end portion and opposing first and second surfaces, such that the first surface of the lever body receives the protrusion, and the second surface of the lever body at the second end portion is coupled to the dome switch; and a rotational position of the button interposer causing a corresponding portion of the curve shape of the protrusion to be received by the first surface of the lever body to adjust the amount of the force to a corresponding amount.

In an embodiment, a surface of the button interposer includes a curve shaped protrusion that curves around an axis of the button interposer with a non-uniform radial width; the adjustment mechanism includes a lever body that includes a pivot end and a second end portion opposing first and second surfaces, such that the first surface of the lever body receives the protrusion, and the second surface of the lever body at the second end portion is coupled to the dome switch, an axis of the button interposer being offset from an axis of the dome switch; and a rotational position of the button interposer causing a corresponding portion of the curve shape of the protrusion to be received by the first surface of the lever body to adjust the amount of the force to a corresponding amount.

In an embodiment, the tactile switch further comprises: a stationary fulcrum within the housing; wherein the adjustment mechanism includes a rotatable lever body, the lever body including: opposing first and second surfaces; a first mating feature on the first surface of the lever body that mates with a second mating feature on a surface of the button interposer; and a curve shaped depression on the second surface of the lever body having an outer edge that curves around an axis of the lever body, the outer edge having a non-uniform radial distance from a perimeter edge of the second surface of the lever body, the dome switch in contact with the second surface of the lever body at the perimeter edge; the outer edge of the depression contacts the fulcrum; and a rotational position of the button interposer determines a rotational position of the lever body, to cause a corresponding portion of the outer edge of the depression to be a pivot for the lever body against the fulcrum, and thereby adjust the amount of the force to a corresponding amount.

In another embodiment, a user input device comprises: a device housing; and a tactile switch mounted to the device housing, the tactile switch comprising: a switch housing; a button interposer; a dome switch contained in the switch housing that is configured to be actuated by pressing the button interposer; and an adjustment mechanism contained at least partially in the switch housing that is configured to enable an amount of force used to press the button interposer to actuate the dome switch to be adjusted.

In an embodiment, the adjustment mechanism includes a slideable lever body, the lever body comprising: a pivot end; a lever arm that extends from the pivot end and has opposing first and second surfaces, such that the first surface of the lever arm receives a surface of the button interposer, and the second surface of the lever arm is coupled to the dome switch; and a handle that extends from the lever body through an opening in a surface of the switch housing, and is configured to be moveable to slide the lever body to adjust the amount of the force.

In an embodiment, the adjustment mechanism includes a lever arm and a slideable fulcrum.

In an embodiment, the lever arm has opposing first and second end portions and opposing first and second surfaces, such that the first surface of the lever arm receives a surface of the button interposer, the second surface of the lever arm at the first end portion contacts the fulcrum, and the second surface of the lever arm at the second end portion is coupled to the dome switch; and the fulcrum has a handle that extends through an opening in a surface of the switch housing, and is configured to be moveable to slide the fulcrum relative to the second surface of the lever arm to adjust the amount of the force.

In an embodiment, the lever arm has opposing first and second end portions and opposing first and second surfaces, such that the first surface of the lever arm at the first end portion receives a surface of the button interposer, the second surface of the lever arm contacts the fulcrum, and the first surface of the lever arm at the second end portion is coupled to the dome switch; and the fulcrum has a handle that extends through an opening in a surface of the switch housing, and is configured to be moveable to slide the fulcrum relative to the second surface of the lever arm to adjust the amount of the force.

In an embodiment, the button interposer is rotatable.

In an embodiment, a surface of the button interposer includes a curve shaped protrusion that curves around an axis of the button interposer with a non-uniform radial distance from the axis; the adjustment mechanism includes a lever body that includes a pivot end and a second end portion and opposing first and second surfaces, such that the first surface of the lever body receives the protrusion, and the second surface of the lever body at the second end portion is coupled to the dome switch; and a rotational position of the button interposer causing a corresponding portion of the curve shape of the protrusion to be received by the first surface of the lever body to adjust the amount of the force to a corresponding amount.

In an embodiment, a surface of the button interposer includes a curve shaped protrusion that curves around an axis of the button interposer with a non-uniform radial width; the adjustment mechanism includes a lever body that includes a pivot end and a second end portion opposing first and second surfaces, such that the first surface of the lever body receives the protrusion, and the second surface of the lever body at the second end portion is coupled to the dome switch, an axis of the button interposer being offset from an axis of the dome switch; and a rotational position of the button interposer causing a corresponding portion of the curve shape of the protrusion to be received by the first surface of the lever body to adjust the amount of the force to a corresponding amount.

In an embodiment, the user input device further comprises: a stationary fulcrum within the switch housing; wherein the adjustment mechanism includes a rotatable lever body, the lever body including: opposing first and second surfaces; a first mating feature on the first surface of the lever body that mates with a second mating feature on a surface of the button interposer; and a curve shaped depression on the second surface of the lever body having an outer edge that curves around an axis of the lever body, the outer edge having a non-uniform radial distance from a perimeter edge of the second surface of the lever body, the dome switch in contact with the second surface of the lever body at the perimeter edge; the outer edge of the depression contacts the fulcrum; and a rotational position of the button interposer determines a rotational position of the lever body, to cause a corresponding portion of the outer edge of the depression to be a pivot for the lever body against the fulcrum, and thereby adjust the amount of the force to a corresponding amount.

In another embodiment, a method for a tactile switch comprises: configuring a button interposer of the tactile switch to be pressable to actuate a dome switch in a housing of the tactile switch; and configuring an adjustment mechanism of the tactile switch to enable an amount of force used to press the button interposer to actuate the dome switch to be adjustable.

In an embodiment, the configuring an adjustment mechanism of the tactile switch to enable an amount of force used to press the button interposer to actuate the dome switch to be adjustable comprises at least one of: configuring a feature of the adjustment mechanism to be slideable to cause an adjustment of the amount of force; or configuring the button interposer to be rotatable to cause the adjustment of the amount of force.

V. Conclusion

While various embodiments of the present disclosure have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A tactile switch, comprising:
    a housing;
    a button interposer;
    a dome switch contained in the housing that is configured to be actuated by pressing the button interposer; and
    an adjustment mechanism including a slideable lever body and contained at least partially in the housing, the slideable lever body configured to be slid to enable an amount of force used to press the button interposer to actuate the dome switch to be adjusted.

2. The tactile switch of claim 1, wherein the slideable lever body comprises a pivot end.

3. The tactile switch of claim 2, wherein the slideable lever body further comprises a lever arm that extends from the pivot end and has opposing first and second surfaces, such that the first surface of the lever arm receives a surface of the button interposer, and the second surface of the lever arm is coupled to the dome switch.

4. The tactile switch of claim 3, wherein the slideable lever body further comprises a handle that extends from the lever body through an opening in a surface of the housing.

5. The tactile switch of claim 1, wherein the button interposer is hat shaped.

6. The tactile switch of claim 1, wherein the button interposer includes flanges movable to interface the button interposer and the housing.

7. The tactile switch of claim 1, wherein the dome switch is rectangular shaped.

8. A user input device, comprising:
    a device housing; and
    a tactile switch mounted to the device housing, the tactile switch comprising:
        a switch housing;
        a button interposer;
        a dome switch contained in the switch housing that is configured to be actuated by pressing the button interposer; and
        an adjustment mechanism including a slideable lever body and contained at least partially in the switch housing, the slideable lever body configured to be slid to enable an amount of force used to press the button interposer to actuate the dome switch to be adjusted.

9. The user input device of claim 8, wherein the slideable lever body comprises a pivot end.

10. The user input device of claim 9, wherein the slideable lever body further comprises a lever arm that extends from the pivot end and has opposing first and second surfaces, such that the first surface of the lever arm receives a surface of the button interposer, and the second surface of the lever arm is coupled to the dome switch.

11. The user input device of claim 10, wherein the slideable lever body further comprises a handle that extends from the lever body through an opening in a surface of the switch housing.

12. The user input device of claim 8, wherein the button interposer is hat shaped.

13. The user input device of claim 8, wherein the button interposer includes flanges movable to interface the button interposer and the switch housing.

14. The user input device of claim 8, wherein the dome switch is rectangular shaped.

15. A method for a tactile switch, comprising:
    configuring a button interposer of the tactile switch to be pres sable to actuate a dome switch in a housing of the tactile switch; and
    configuring a slideable lever body of an adjustment mechanism of the tactile switch to be slid to enable an amount of force used to press the button interposer to actuate the dome switch to be adjustable.

16. The method of claim 15, wherein the slideable lever body comprises a pivot end.

17. The method of claim 16, wherein the slideable lever body further comprises a lever arm that extends from the pivot end and has opposing first and second surfaces, such that the first surface of the lever arm receives a surface of the button interposer, and the second surface of the lever arm is coupled to the dome switch.

18. The method of claim 17, wherein the slideable lever body further comprises a handle that extends from the lever body through an opening in a surface of the housing.

19. The method of claim 15, wherein the button interposer includes flanges movable to interface the button interposer and the housing.

20. The method of claim 18, wherein the button interposer is hat shaped.

* * * * *